(12) United States Patent
Rekimoto

(10) Patent No.: US 10,600,253 B2
(45) Date of Patent: Mar. 24, 2020

(54) INFORMATION PROCESSING APPARATUS, INFORMATION PROCESSING METHOD, AND PROGRAM

(71) Applicant: SONY CORPORATION, Tokyo (JP)

(72) Inventor: Junichi Rekimoto, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/755,159

(22) PCT Filed: Jul. 12, 2016

(86) PCT No.: PCT/JP2016/070585
§ 371 (c)(1),
(2) Date: Feb. 26, 2018

(87) PCT Pub. No.: WO2017/051592
PCT Pub. Date: Mar. 30, 2017

(65) Prior Publication Data
US 2018/0247463 A1 Aug. 30, 2018

Related U.S. Application Data

(60) Provisional application No. 62/232,621, filed on Sep. 25, 2015.

(51) Int. Cl.
*H04N 13/111* (2018.01)
*G06T 19/20* (2011.01)
(Continued)

(52) U.S. Cl.
CPC .............. *G06T 19/20* (2013.01); *G06T 19/00* (2013.01); *H04N 5/232* (2013.01); *H04N 5/262* (2013.01);
(Continued)

(58) Field of Classification Search
CPC ........ H04N 5/28; H04N 7/181; H04N 13/204; H04N 21/472; H04N 5/232; H04N 5/262;
(Continued)

(56) References Cited

U.S. PATENT DOCUMENTS 5,101,268 A 3/1992 Ohba
6,331,853 B1 * 12/2001 Miyashita ............... A63F 13/10
345/427
(Continued)

FOREIGN PATENT DOCUMENTS

JP 03-175886 A 7/1991
JP H11161812 * 11/1997
(Continued)

OTHER PUBLICATIONS

International Search Report dated Oct. 4, 2016 in PCT/JP2016/070585.
(Continued)

*Primary Examiner* — Philip P. Dang
(74) *Attorney, Agent, or Firm* — Xsensus LLP

(57) ABSTRACT

An information processing apparatus including: a display control unit configured to cause a first video to be displayed in a display area that a user visually recognizes, the first video being captured by a first imaging unit mounted on a first moving body that moves in a first space. The display control unit generates a first transition video corresponding to a viewpoint position that is moved continuously between a first viewpoint which is a viewpoint of the first imaging unit and a second viewpoint for imaging the first space.

15 Claims, 24 Drawing Sheets

(51) Int. Cl.

| | | |
|---|---|---|
| *H04N 5/232* | (2006.01) | |
| *H04N 7/18* | (2006.01) | |
| *H04N 13/00* | (2018.01) | |
| *G06T 19/00* | (2011.01) | |
| *H04N 21/472* | (2011.01) | |
| *H04N 5/262* | (2006.01) | |
| *H04N 13/204* | (2018.01) | |
| *H04N 5/28* | (2006.01) | |
| *A63F 13/525* | (2014.01) | |
| *B25J 9/16* | (2006.01) | |

(52) U.S. Cl.
CPC ............... *H04N 5/28* (2013.01); *H04N 7/18* (2013.01); *H04N 7/181* (2013.01); *H04N 13/00* (2013.01); *H04N 13/204* (2018.05); *H04N 21/472* (2013.01); *A63F 13/525* (2014.09); *B25J 9/1689* (2013.01); *G06T 2219/2016* (2013.01)

(58) Field of Classification Search
CPC .......... H04N 7/18; H04N 13/00; G06T 19/20; G06T 19/00; G06T 2219/2016; A63F 13/525; B25J 9/1689
See application file for complete search history.

(56) References Cited

U.S. PATENT DOCUMENTS

| | | | |
|---|---|---|---|
| 7,312,766 B1 * | 12/2007 | Edwards | G02B 27/017 248/115 |
| 7,690,988 B2 * | 4/2010 | Kaido | A63F 13/10 463/23 |
| 8,265,455 B2 * | 9/2012 | Shinkai | H04N 9/8205 386/224 |
| 8,535,154 B2 * | 9/2013 | Minato | A63F 13/525 345/156 |
| 8,870,654 B2 * | 10/2014 | Nakayama | A63F 13/02 463/37 |
| 8,885,024 B2 * | 11/2014 | Grover | H04N 13/243 348/47 |
| 8,982,117 B2 * | 3/2015 | Park | H04N 13/398 345/419 |
| 9,116,555 B2 * | 8/2015 | Nakayama | G06F 3/033 |
| 9,396,385 B2 * | 7/2016 | Bentley | G11B 27/17 |
| 9,781,340 B2 * | 10/2017 | Shinozaki | H04N 5/23238 |
| 2006/0227151 A1 | 10/2006 | Bannai | |
| 2008/0096654 A1 * | 4/2008 | Mondesir | A63F 13/06 463/31 |
| 2008/0096657 A1 * | 4/2008 | Benoist | A63F 13/837 463/36 |
| 2009/0163275 A1 * | 6/2009 | Ishii | A63F 13/10 463/31 |
| 2009/0170579 A1 * | 7/2009 | Ishii | A63F 13/10 463/2 |
| 2010/0026809 A1 | 2/2010 | Curry | |
| 2010/0309370 A1 * | 12/2010 | Ueshima | A63F 13/10 348/371 |
| 2011/0181703 A1 * | 7/2011 | Kobayashi | A63F 13/525 348/46 |
| 2012/0320100 A1 * | 12/2012 | Machida | G02B 27/017 345/690 |
| 2013/0141573 A1 | 6/2013 | Sutter et al. | |
| 2013/0165194 A1 * | 6/2013 | Nojiri | A63F 13/10 463/5 |
| 2013/0249896 A1 * | 9/2013 | Hamagishi | G09G 3/003 345/419 |
| 2014/0160129 A1 * | 6/2014 | Sako | G06F 3/011 345/427 |
| 2014/0186002 A1 | 7/2014 | Hanaya et al. | |
| 2014/0267208 A1 * | 9/2014 | Yajima | G02B 27/017 345/211 |
| 2015/0187088 A1 * | 7/2015 | Iwai | G06K 9/00771 345/634 |

FOREIGN PATENT DOCUMENTS

| | | | |
|---|---|---|---|
| JP | 2006-293604 A | | 10/2006 |
| JP | 2012-128737 | * | 12/2010 |
| JP | 2012-15788 A | | 1/2012 |
| JP | 2012-25327 A | | 2/2012 |
| JP | 2012-109719 A | | 6/2012 |
| JP | 2014-127735 A | | 7/2014 |
| JP | 2014-127987 A | | 7/2014 |
| JP | 2014-233007 A | | 12/2014 |

OTHER PUBLICATIONS

Shunichi Kasahara et al: "JackIn", Mar. 7, 2014; Mar. 7, 2014-Mar. 8, 2014, Mar. 7, 2014 (Mar. 7, 2014), pp. 1-8, XPO58047978, DOI: 10.1145/2582051.2582097 ISBN: 978-1-4503-2761-9 *the whole document *.

Extended European Search Report dated Apr. 2, 2019, issued in corresponding European Patent Application No. 16848382.4.

* cited by examiner

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

Conventionally, telepresence is known as a technique for a user to communicate with a remote surrogate robot. By this telepresence, information measured by the robot is transferred to the user. In addition, user's motions control the robot, and as a result, the user may feel as if he/she is integral with the robot. According to this telepresence, the user may perceive as if there are no restrictions in physical position.

Moreover, a technology that enables telepresence between persons has recently been proposed. For example, a technology in which a user wearing a head-mounted camera conducts work in a certain environment, and video captured by this head-mounted camera is transferred to another remote user has been proposed. According to this technology, a field worker positioned in a certain environment, for example, may be remotely assisted by an expert.

For example, Patent Literature 1 below describes a technology of causing video captured by an imaging device mounted on a moving body moving in a space to be displayed in a display area that a user visually recognizes.

CITATION LIST

Patent Literature

Patent Literature 1: WO 2015/122108

DISCLOSURE OF INVENTION

Technical Problem

However, in the technology described in Patent Literature 1, when a transition is performed between viewpoints positioned in a space, displayed video is switched discontinuously. Thus, a user may become unable to grasp the positional relationship after the viewpoint transitions.

Therefore, the present disclosure proposes an information processing apparatus, an information processing method, and a program being novel and improved that can generate video that allows a user to easily understand a change in positional relationship resulting from a viewpoint transition.

Solution to Problem

According to the present disclosure, there is provided an information processing apparatus including: a display control unit configured to cause first video to be displayed in a display area that a user visually recognizes, the first video being captured by a first imaging unit mounted on a first moving body that moves in a first space. The display control unit generates first transition video corresponding to a viewpoint position that is moved continuously between a first viewpoint which is a viewpoint of the first imaging unit and a second viewpoint for imaging the first space.

In addition, according to the present disclosure, there is provided an information processing method including: causing first video to be displayed in a display area that a user visually recognizes, the first video being captured by a first imaging unit mounted on a first moving body that moves in a first space; and generating, by a processor, first transition video corresponding to a viewpoint position that is moved continuously between a first viewpoint which is a viewpoint of the first imaging unit and a second viewpoint for imaging the first space.

In addition, according to the present disclosure, there is provided a program for causing a computer to function as a display control unit configured to cause first video to be displayed in a display area that a user visually recognizes, the first video being captured by a first imaging unit mounted on a first moving body that moves in a first space. The display control unit generates first transition video corresponding to a viewpoint position that is moved continuously between a first viewpoint which is a viewpoint of the first imaging unit and a second viewpoint for imaging the first space.

Advantageous Effects of Invention

According to the present disclosure as described above, it is possible to generate video that allows a user to easily understand a change in positional relationship resulting from a viewpoint transition. Note that the effects described herein are not necessarily limitative, but any of the effects described in the present disclosure may be exerted.

MODE(S) FOR CARRYING OUT THE INVENTION

Figure 1:
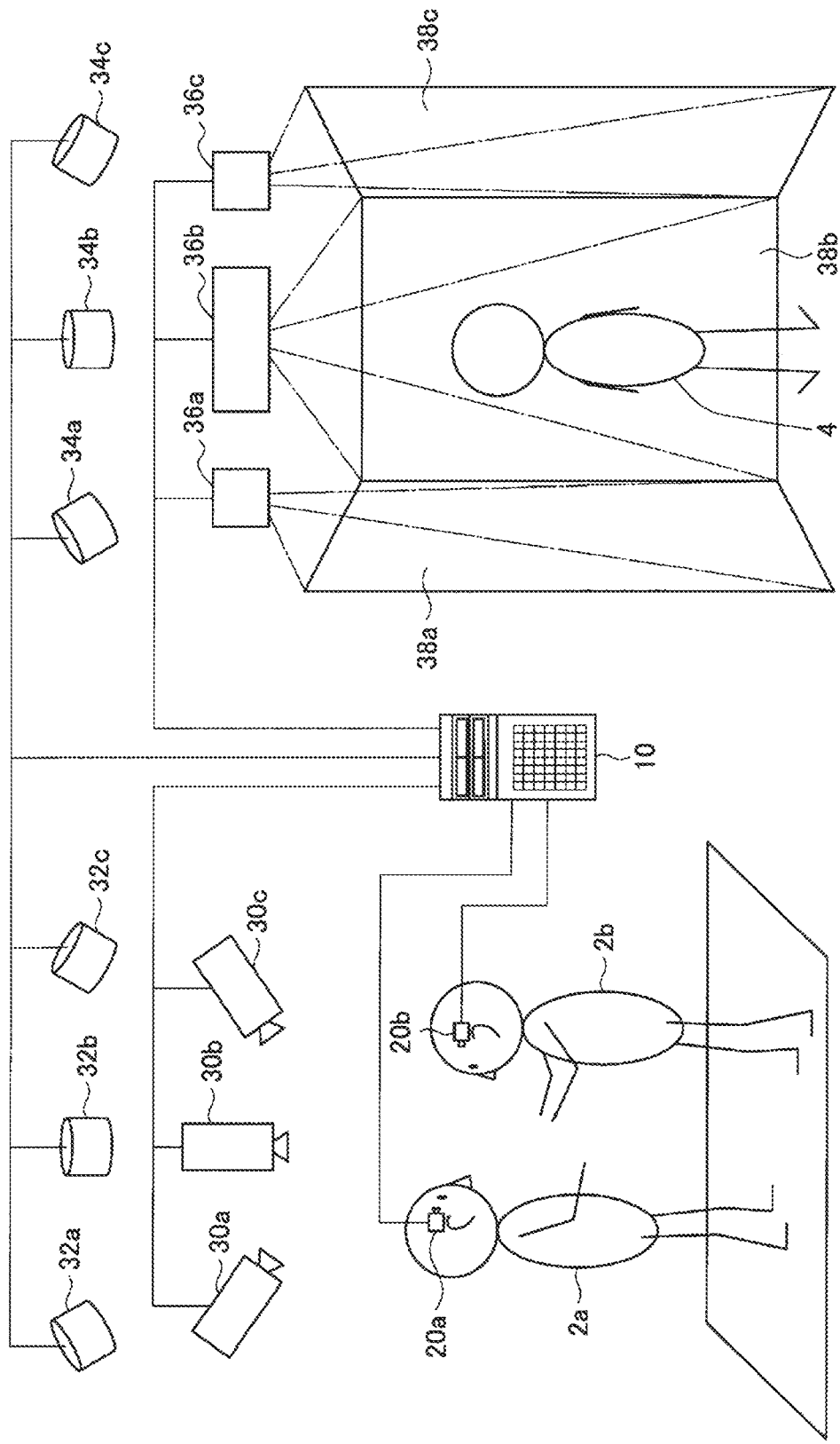
FIG. 1 is an explanatory diagram showing a configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and drawings, a plurality of structural elements that have substantially the same function and structure are distinguished in some cases by adding different alphabets after the same reference numerals. For example, a plurality of components that have substantially the same function and structure are distinguished like a moving body 2a and a moving body 2b according to necessity. However, in a case where it is not particularly necessary to distinguish between a plurality of respective structural elements that have substantially the same function and structure, the same reference numerals are merely given. For example, in a case where it is not particularly necessary to distinguish between the moving body 2a and the moving body 2b, they are simply referred to as moving bodies 2.

In addition, the "mode(s) for carrying out the invention" will be described in accordance with the order of items shown below.
1. Configuration of information processing system
2. Detailed description of embodiment
3. Hardware configuration
4. Modification 1. Configuration of Information Processing System First, a configuration of an information processing system according to the present embodiment will be described with reference to FIG. 1. As shown in FIG. 1, in the present embodiment, a workspace in which one or more moving bodies 2 are positioned and an environment in which a user 4 is positioned are basically provided, and it is assumed that the both are remote from each other. Here, the moving body 2 is, for example, a person who conducts work in a predetermined workspace, a robot, a camera (sensor) installed in a workspace, or the like. Note that the following description will be made centering on an example in which the moving body 2 is a person. In addition, the predetermined workspace is a space such as a room, for example. In addition, the user 4 is a person who visually recognizes video concerning a workspace, provided by a server 10 which will be described later. Note that the workspace is an example of a first space in the present disclosure. In addition, the server 10 is an example of an information processing apparatus in the present disclosure.

<1-1. Environment of Moving Body 2>

First, a configuration of an information processing system concerning a workspace in which the moving body 2 is positioned will be described. As shown in FIG. 1, a plurality of depth cameras 30 and a plurality of motion capture sensors 32 are arranged in a workspace, for example.

Figure 2:
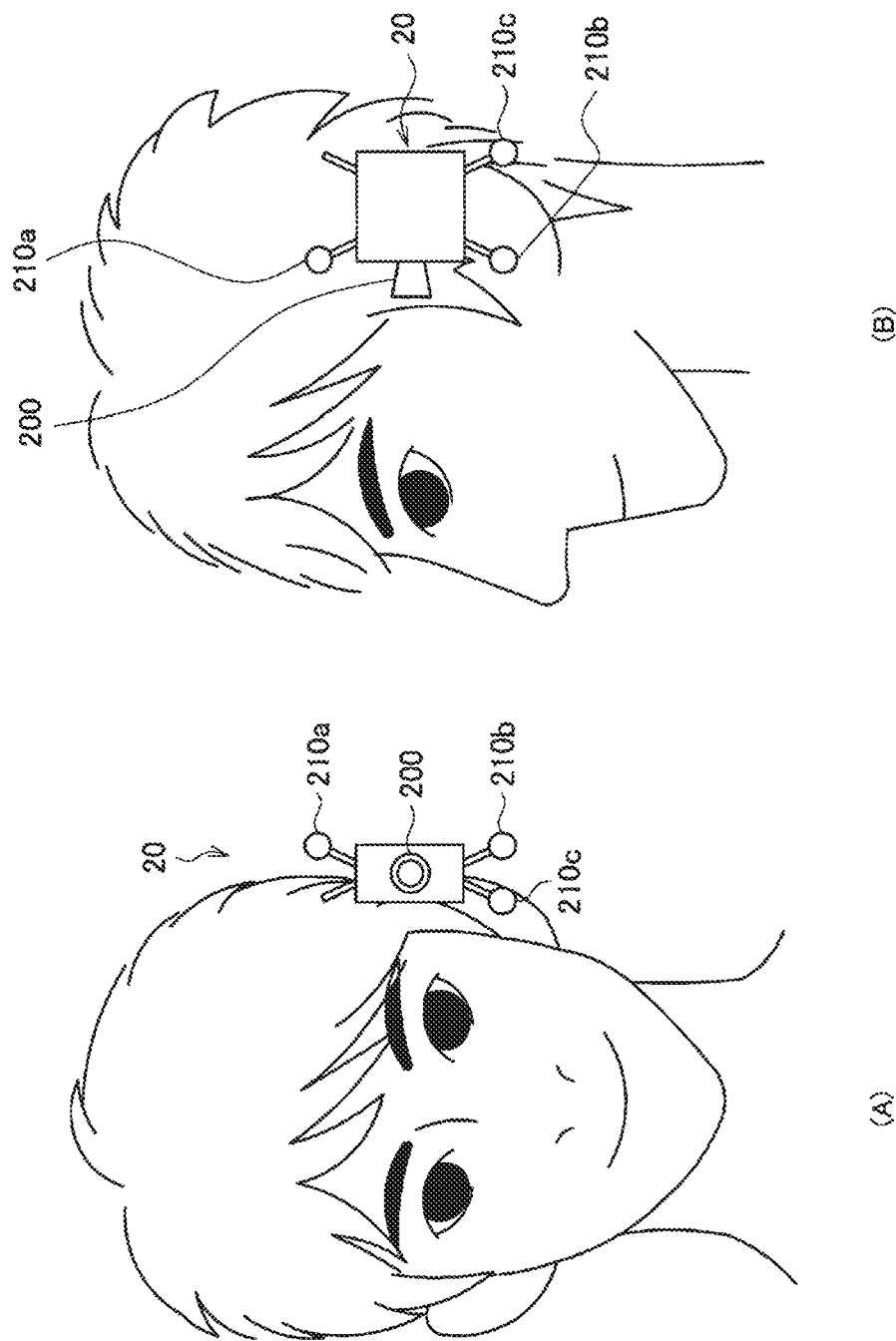
FIG. 2 is an external view of a headset 20 mounted on a moving body 2 according to the embodiment.

Note that, in a case where the moving body 2 is a person, the moving body 2 wears a headset 20, for example, as shown in FIG. 1 and FIG. 2. Note that FIG. 2(A) is a diagram showing an appearance of the moving body 2 wearing the headset 20 from the front, and FIG. 2(B) is a diagram showing an appearance of the moving body 2 wearing the headset 20 from the left side. As shown in FIG. 2, the headset 20 has a camera 200 and a head tracking marker 210, for example. Here, the camera 200 is an example of a first imaging unit in the present disclosure. The camera 200 captures video in a line-of-sight direction of the moving body 2, for example. For example, the camera 200 may be a fish-eye camera.

The head tracking marker 210 is a marker that reflects infrared rays, for example. As shown in FIG. 2, a plurality of head tracking markers 210 may be installed in a single headset 20. This head tracking marker 210 may be sensed by the plurality of motion capture sensors 32 (installed in the workspace). Accordingly, the position of the moving body 2 in the workspace is tracked.

The depth camera 30 has a depth sensor and an RGB sensor, for example. This depth camera 30 acquires three-dimensional information regarding each object positioned in the workspace. For example, the depth camera 30 acquires three-dimensional information regarding each object positioned in the workspace by using irradiation of infrared rays and time-of-flight.

Note that, as shown in FIG. 1, the plurality of depth cameras 30 are basically installed in the workspace. In addition, each of the motion capture sensors 32 and each of the depth cameras 30 may each be calibrated in advance such that coordinate values of the same object sensed in the workspace become the same. Then, as will be described later, the server 10 is capable of configuring a point cloud (a set of such information that each point has three-dimensional coordinates) by integrating information regarding RGB-D sensed by the plurality of depth cameras 30. Accordingly, it is possible to specify three-dimensional coordinates of each moving body 2 in the workspace.

Figure 3:
FIG. 3 is an example of an image showing a point cloud configured by the embodiment.

For example, FIG. 3 is an example of an image 40 showing a point cloud configured on the basis of information sensed by the plurality of depth cameras 30. It is usually difficult for a single depth camera 30 to image the entire workspace, and an area that cannot be sensed may occur.

Therefore, the plurality of depth cameras 30 installed at different positions from one another in the workspace sense the workspace, and then, pieces of sensed information are integrated, so that the area that cannot be sensed may be minimized.

The server 10 performs generation of video to be visually recognized by the user 4, display control, and the like. For example, the server 10 acquires video captured by the camera 200 (of the headset 20) mounted on a certain moving body 2, and then generates moving body video on the basis of the captured video having been acquired. Then, the server 10 causes projectors 36 which will be described later to project the generated moving body video.

Note that the server 10 may be installed in the workspace, or may be installed in the environment in which the user 4 is positioned, or may be installed at another place.

<1-2. Environment of User 4>

Next, a configuration of the information processing system concerning the environment in which the user 4 is positioned will be described. For example, as shown in FIG. 1, a plurality of motion capture sensors 34, three projectors 36, and three screens 38 are arranged in the environment.

The motion capture sensors 34 detect a motion of the user 4 in the environment. For example, the motion capture sensors 34 detect a motion of the head of the user 4.

The projectors 36 are devices that project an image by light emission. For example, the projectors 36 receive video from the server 10, and then project the received video on the screens 38. In the example shown in FIG. 1, three screens 38 are installed in such a positional relationship that the screens 38 are positioned on the front, the left side, and the right side of the user 4, respectively. Then, each projector 36 projects video for the screen 38 in the direction of each projector 36 on each screen 38. In addition, the three projectors 36 are also capable of projecting stereo video on one or more screens 38.

The user 4 may wear 3D eyeglasses having a liquid crystal display (LCD), for example. This allows the user 4 to stereoscopically view video displayed on the screens 38.

According to the above-described information processing system, the user 4 can obtain a feeling as if he/she is positioned in the workspace by visually recognizing video in the workspace projected on the screens 38. In addition, cooperation between the moving body 2 and the user 4, such as working support to the moving body 2 by the user 4, for example, is made possible.

Note that the information processing system for the environment in which the user 4 is positioned is not limited to the above-described configuration, but only a single screen 38 may be installed. Further, in this case, only a single projector 36 may also be installed.

In addition, the above-described information processing system can be configured as a distribution system via a communication network such as the Internet, for example. For example, the workspace (in which the moving body 2 is positioned), the environment in which the user 4 is positioned, and the server 10 are positioned at sites apart from one another, and then, devices installed at the respective sites may be connected via the communication network.

<1-3. Overview>

[1-3-1. Problems in Publicly-Known Technology]

In the meanwhile, in a case where a plurality of moving bodies 2 exist in a workspace, it is desirable that the user 4 positioned remotely can transition freely between viewpoints of the respective moving bodies 2 (hereinafter may be referred to as moving body viewpoints) and can visually recognize video in the workspace.

However, when switching viewpoints as if a camera is switched, for example, the user 4 may be unable to grasp the positional relationship in the workspace after switching viewpoints, and may be confused.

Therefore, the server 10 according to the present embodiment has been created using the above-described circumstances as a point of view. When a transition is made between moving body viewpoints of the moving bodies 2 in a workspace, the server 10 causes the transition to pass through a space monitoring viewpoint for monitoring the workspace. Further, when a transition is made between a moving body viewpoint and a space monitoring viewpoint, the server 10 is capable of generating video by continuously moving the viewpoint position between the moving body viewpoint of the moving body 2 and the space monitoring viewpoint, and then causing the user 4 to visually recognize the generated video. This allows a viewpoint movement in the workspace to be presented to the user 4 without spatial gaps.

[1-3-2. Overview of Telepresence]

Figure 4:
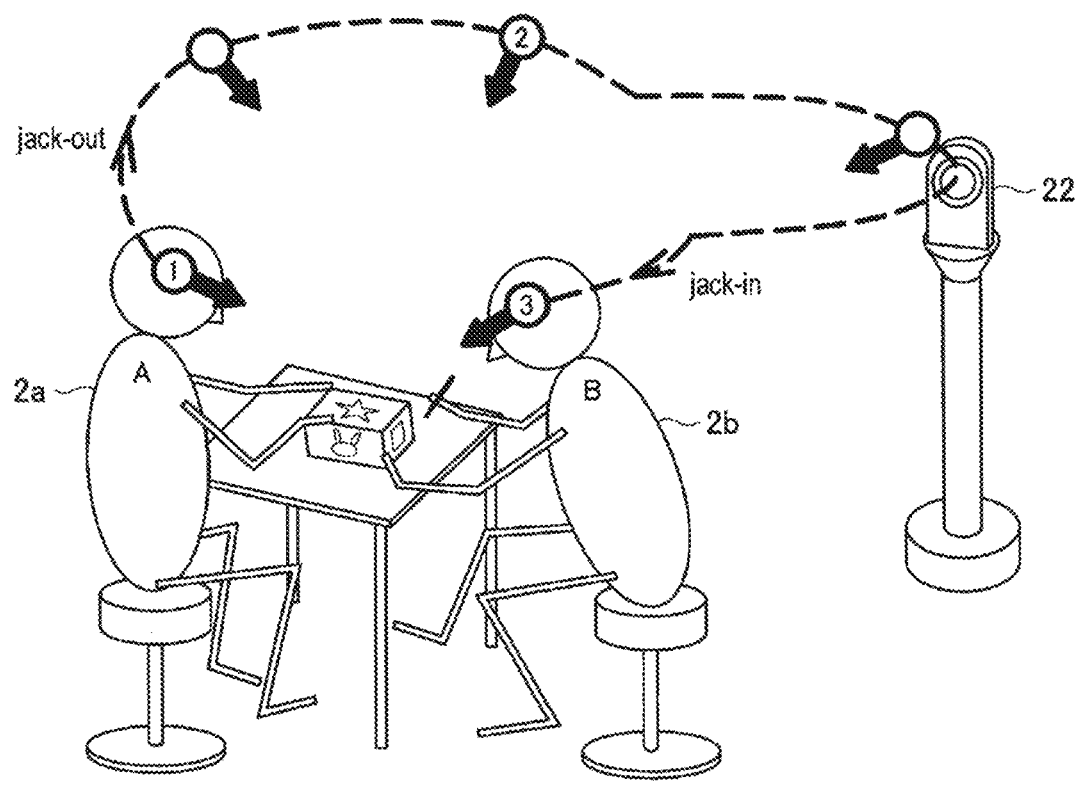
FIG. 4 is an explanatory diagram schematically showing a viewpoint movement based on jack-out and jack-in according to the embodiment.
Figure 5:
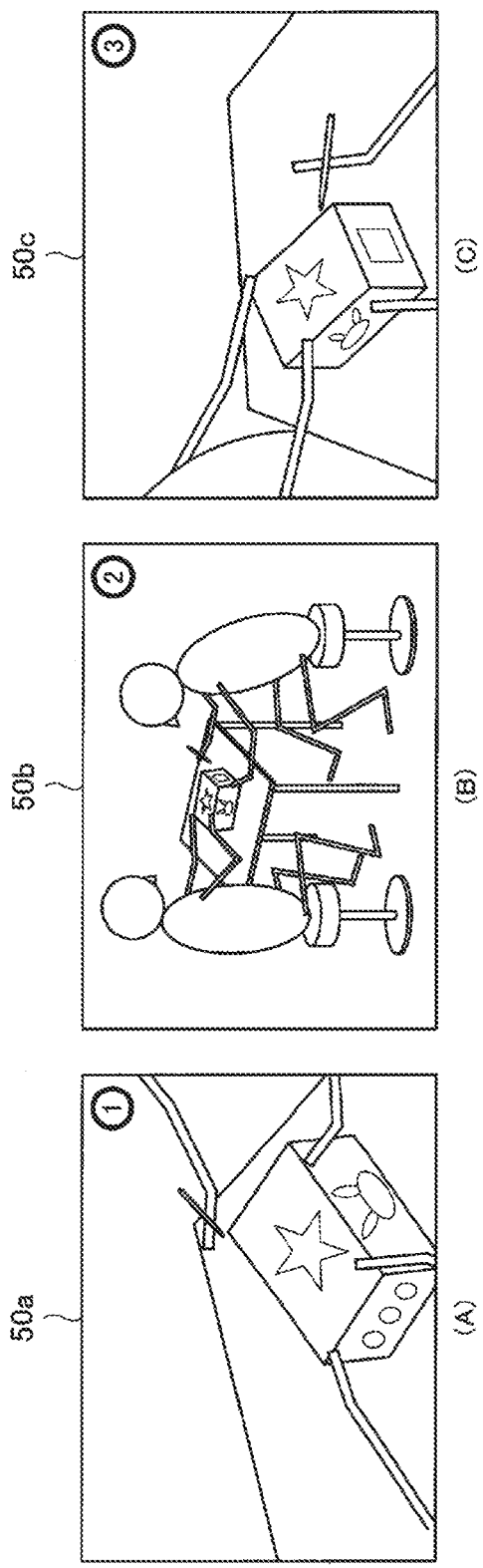
FIG. 5 is an explanatory diagram showing an example of video generated on the basis of a viewpoint "1" to a viewpoint "3" shown in FIG. 4.

Here, an overview of telepresence achieved by the present embodiment will be described with reference to FIG. 4 and FIG. 5. FIG. 4 is an explanatory diagram schematically showing a viewpoint movement based on jack-out and jack-in according to the present embodiment. Here, jack-out is to cause the viewpoint to transition from a moving body viewpoint of the moving body 2 which is a capturing source of video that the user 4 is visually recognizing at present to a space monitoring viewpoint. In addition, jack-in is to cause the viewpoint to transition from a (current) space monitoring viewpoint to a moving body viewpoint of any moving body 2 positioned in the workspace.

In addition, FIG. 5(A) shows an example of video (hereinafter may be referred to as moving body video) based on a moving body viewpoint (an arrow "1" shown in FIG. 4) of the moving body 2a shown in FIG. 4. In addition, FIG. 5(B) shows an example of video (hereinafter may be referred to as space monitoring video) based on a space monitoring viewpoint (an arrow "2" shown in FIG. 4). In addition, FIG. 5(C) shows an example of video based on a moving body viewpoint (an arrow "3" shown in FIG. 4) of the moving body 2b shown in FIG. 4.

Note that FIG. 4 is premised on that the user 4 is performing jack-in in the moving body 2a, as an initial state. In this case, video 50a based on the moving body viewpoint of the moving body 2a as shown in FIG. 5(A) is projected on the screens 38, and then, the user 4 is visually recognizing the video 50a. By visually recognizing this moving body video 50a, the user 4 can obtain a feeling as if he/she has entered the moving body 2a.

Thereafter, when the user 4 issues a "jack-out" command, the server 10 continuously moves the viewpoint position from the moving body viewpoint of the moving body 2a to the space monitoring viewpoint. Note that the issuance of the "jack-out" command is an example of a first operation in the present disclosure.

Thereafter, video 50b based on the space monitoring viewpoint as shown in FIG. 5(B), for example, is projected on the screens 38. This allows the user 4 to panoramically monitor the entire workspace, for example. Note that the user 4 can monitor the workspace while freely moving the position of the space monitoring viewpoint in the workspace.

It is assumed that the user 4 thereafter desires to visually recognize video through a moving body viewpoint of the other moving body 2b shown in FIG. 4. In this case, first, the user 4 selects the moving body 2b by a predetermined method, and then issues a "jack-in" command. Then, the server 10 continuously moves the viewpoint position from the space monitoring viewpoint to the moving body viewpoint of the moving body 2b. Thereafter, video 50c based on the moving body viewpoint of the moving body 2b as shown in FIG. 5(C), for example, is projected on the screens 38.

Note that video based on the moving body viewpoint of the moving body 2 provides a clear image, but basically it is not stereoscopic video. Therefore, the user 4 can perform jack-out from the moving body 2 in which the user 4 is performing jack-in, for example, to stereoscopically view the workspace on the basis of the space monitoring viewpoint. Thereafter, in order to check detailed video, it is also possible to perform jack-in in the same moving body 2 again.

2. Detailed Description of Embodiment

2-1. Configuration

Figure 6:
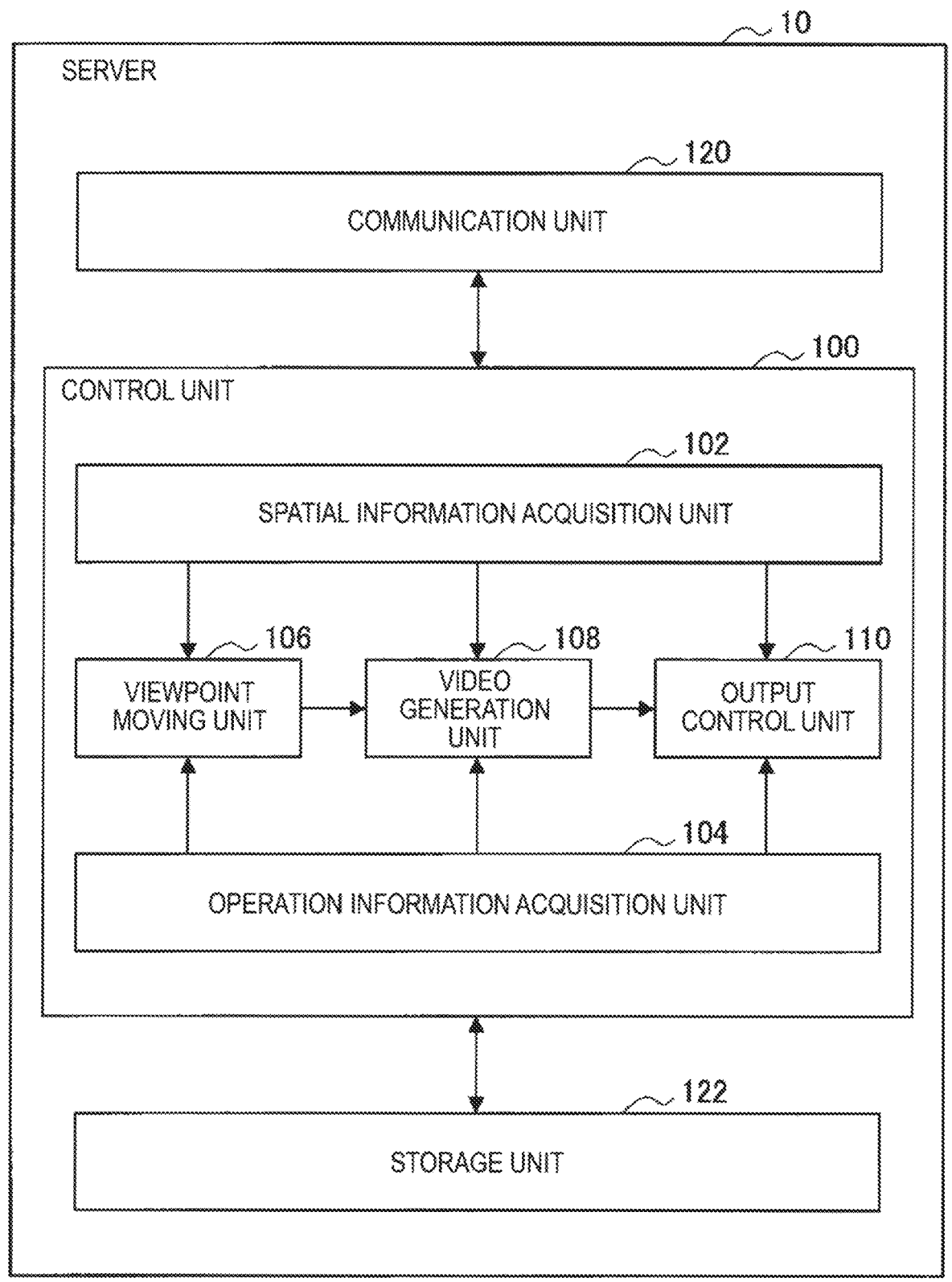
FIG. 6 is a functional block diagram showing a configuration example of a server 10 according to the embodiment.

An overview of the present embodiment has been described above. Next, a configuration of the server 10 according to the present embodiment will be described in detail. FIG. 6 is a functional block diagram showing a configuration of the server 10 according to the present embodiment. As shown in FIG. 6, the server 10 has a control unit 100, a communication unit 120, and a storage unit 122.

[2-1-1. Control Unit 100]

The control unit 100 generally controls the operations of the server 10 using hardware such as a CPU 150 and a RAM 154, which will be described later, built in the server 10. In addition, as shown in FIG. 6, the control unit 100 has a spatial information acquisition unit 102, an operation information acquisition unit 104, a viewpoint moving unit 106, a video generation unit 108, and an output control unit 110.

[2-1-2. Spatial Information Acquisition Unit 102]

The spatial information acquisition unit 102 acquires three-dimensional information and image information sensed in a workspace, for example. For example, the spatial information acquisition unit 102 receives information regarding RGB-D sensed by the plurality of depth cameras 30 in the workspace from the plurality of depth cameras 30.

In addition, the spatial information acquisition unit 102 configures a point cloud on the basis of the three-dimensional information and image information having been acquired.

[2-1-3. Operation Information Acquisition Unit 104]

The operation information acquisition unit 104 acquires information regarding an operation of the user 4. For example, the operation information acquisition unit 104 acquires information regarding an operation of issuing the "jack-in" command or the "jack-out" command. Here, the operation of issuing the "jack-in" command or the "jack-out" command may be a gesture operation, an operation on an operation unit (illustration omitted), a voice input, a line-of-sight operation, or the like, for example. In addition, the gesture operation is a head gesture, a hand gesture, or the like, for example. In addition, the operation unit is a joystick, a touch panel, or the like, for example.

For example, the operation information acquisition unit 104 acquires information (such as the position, acceleration, and speed) regarding the head of the user 4 detected by the motion capture sensors 34 and the like, and then recognizes a head gesture on the basis of the acquired information. As an example, in a case where a motion of the user 4 quickly moving his/her head rearward and diagonally upward is detected, the operation information acquisition unit 104 recognizes the detected motion as a head gesture for issuing the "jack-out" command.

(2-1-3-1. Selection of Jack-in Target)

Figure 7:
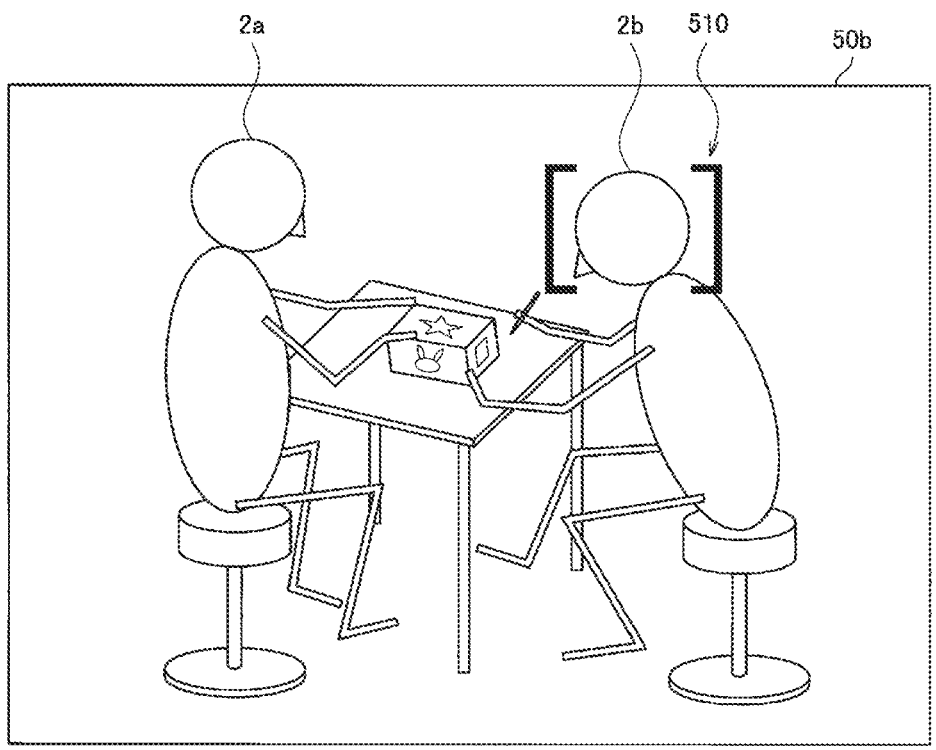
FIG. 7 is an explanatory diagram showing a display example of a "lock-on" mark when displaying space monitoring video, according to the embodiment.

Moreover, before the issuance of the "jack-in" command, for example, the operation information acquisition unit 104 acquires information regarding an operation in which the user 4 selects the moving body 2 as a "jack-in" target. For example, in a case where it is detected that the user 4 has directed the line of sight toward any of one or more moving bodies 2 displayed in space monitoring video, the operation information acquisition unit 104 recognizes the moving body 2 to which the line of sight has been directed as the moving body 2 as the "jack-in" target. Note that, on this occasion, the control of the output control unit 110 may cause a "lock-on" mark 510 to be displayed in an overlapping manner in the vicinity of the moving body 2 as the "jack-in" target, for example, in the space monitoring video, as shown in FIG. 7.

Alternatively, in a case where an operation in which the user 4 selects any of one or more POIs positioned in the workspace is detected, the operation information acquisition unit 104 recognizes the moving body 2 corresponding to the selected POI as the moving body 2 as the "jack-in" target. Here, the POI includes a predetermined position such as the center of a working table, for example, in the workspace, the position of the moving body 2, and the like. Note that, when the space monitoring video is displayed, for example, a POT selection UI may be presented to the user 4. Then, the user 4 can select any POI using this selection UI.

[2-1-4. Viewpoint Moving Unit 106]

The viewpoint moving unit 106 continuously moves the viewpoint position between the moving body viewpoint of the moving body 2 and the space monitoring viewpoint on the basis of operation information acquired by the operation information acquisition unit 104 and a point cloud configured by the spatial information acquisition unit 102. For example, the viewpoint moving unit 106 determines a moving path that continuously connects the moving body viewpoint of the moving body 2 and the space monitoring viewpoint, and then continuously moves the viewpoint position along the determined moving path. Further, the viewpoint moving unit 106 is also capable of determining the viewpoint direction such that the viewpoint direction changes continuously in accordance with the movement of the viewpoint position on the moving path. Further, the viewpoint moving unit 106 is also capable of determining an angle of view such that the angle of view changes continuously in accordance with the movement of the viewpoint position on the moving path.

(2-1-4-1. During Jack-Out)

For example, in a case where operation information indicating the issuance of the "jack-out" command is acquired by the operation information acquisition unit 104, the viewpoint moving unit 106 continuously moves the viewpoint position from the moving body viewpoint of the moving body 2 in which the user 4 is performing jack-in to the space monitoring viewpoint.

Figure 8:
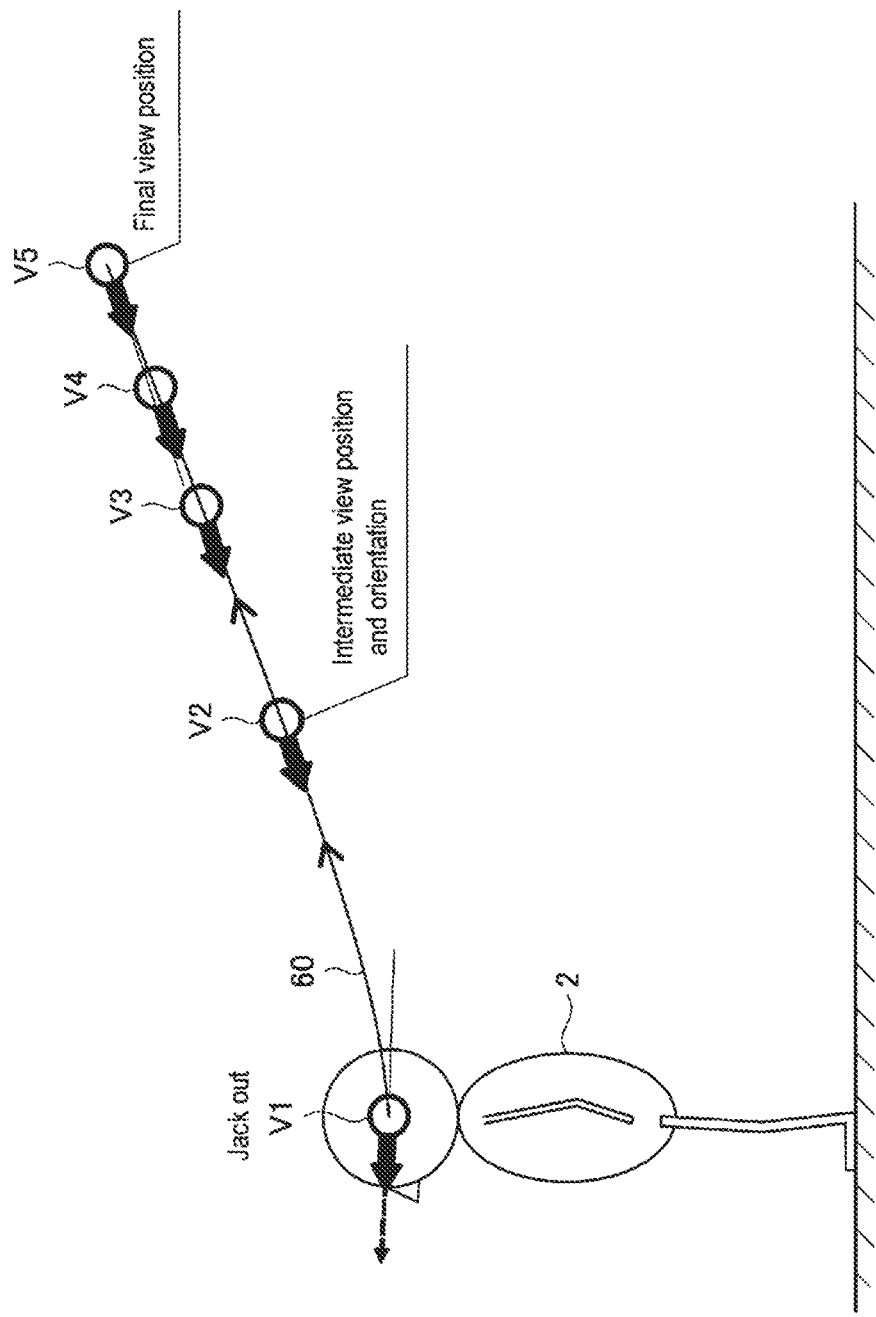
FIG. 8 is an explanatory diagram showing a viewpoint moving example during jack-out according to the embodiment.

Here, with reference to FIG. 8, the above contents will be described in further detail. FIG. 8 is an explanatory diagram showing an example of a moving path (a moving path 60) determined by the viewpoint moving unit 106 in a case where the "jack-out" command has been issued. In this case, for example, the viewpoint moving unit 106 causes a viewpoint V1 at the starting point of the moving path 60 to match with the moving body viewpoint of the moving body 2 in which the user 4 is performing jack-in and causes a viewpoint V5 at the end point of the moving path 60 to match with the space monitoring viewpoint, on the basis of the point cloud configured by the spatial information acquisition unit 102. Then, the viewpoint moving unit 106 determines the moving path 60 by linearly interpolating the viewpoint position such that the viewpoint position changes continuously. As shown in FIG. 8, for example, the viewpoint moving unit 106 may determine the moving path 60 as a Bezier curve. Note that, on this occasion, the position of the space monitoring viewpoint may be set to be rearward and upward with respect to the moving body 2 in the workspace, and the direction of the space monitoring viewpoint may be set at a direction toward the moving body 2, as shown in FIG. 8.

Further, for example, the viewpoint moving unit 106 may cause the direction of the viewpoint V1 at the starting point of the moving path 60 to match with the direction of the moving body viewpoint of the moving body 2 in which the user 4 is performing jack-in, and may cause the direction of the viewpoint V5 at the end point of the moving path 60 to match with the direction of the space monitoring viewpoint. Then, the viewpoint moving unit 106 may linearly interpolate the viewpoint direction on the moving path 60 such that the viewpoint direction changes continuously in accordance with the movement of the viewpoint position. According to the above-described determination example, video based on the space monitoring viewpoint when jack-out is completed may be such video that the moving body 2 is looked down from the rear side of the moving body 2. Further, the video may be such video that the moving body 2 is positioned at the center of the video.

Accordingly, in a case where the moving body 2 is a person, for example, such transition video in which the user 4 exits from the head of the person in which the user 4 is performing jack-in, and then the viewpoint rises continuously rearward and upward with respect to the person is generated. Consequently, the user 4 can obtain a feeling as if he/she exits from the body of the person by visually recognizing the transition video.

Further, the viewpoint moving unit 106 is also capable of determining an angle of view on the moving path 60 such that the angle of view changes continuously between the starting point and the end point of the moving path 60. In the example shown in FIG. 8, for example, the viewpoint moving unit 106 may cause the angle of view at the viewpoint V1 at the starting point of the moving path 60 to match with the angle of view at the moving body viewpoint of the moving body 2 in which the user 4 is performing jack-in, and may cause the angle of view at the viewpoint V5 at the end point of the moving path 60 to match with the angle of view at the space monitoring viewpoint. Then, the viewpoint moving unit 106 may linearly interpolate the angle of view on the moving path 60 such that the angle of view changes continuously in accordance with the movement of the viewpoint position.

In addition, the viewpoint moving unit 106 is capable of determining, on the basis of the positional relationship between a current viewpoint position and the end point position on the determined moving path, the moving speed of the current viewpoint position. In the example shown in FIG. 8, for example, viewpoints V2, V3, V4, and V5 respectively indicate viewpoints moved at unit time intervals along the moving path determined by the viewpoint moving unit 106. As shown in FIG. 8, the viewpoint moving unit 106 determines the viewpoint moving speed such that the moving speed decreases as the viewpoint position on the moving path 60 approaches the end point. Here, the relationship between the elapsed time and the viewpoint moving speed may be linear, or may be nonlinear. For example, the viewpoint moving unit 106 may determine the viewpoint moving speed such that the relationship between the elapsed time and the viewpoint moving speed matches with a predetermined logarithmic function. Alternatively, the viewpoint moving unit 106 may determine the viewpoint moving speed such that the viewpoint moving speed changes like slow-in and slow-out along the determined moving path. That is, the viewpoint moving unit 106 may determine the viewpoint moving speed such that the moving speed is gradually accelerated from the starting point to the intermediate location on the moving path, and then the moving speed is gradually decelerated from the intermediate location to the end point.

Determination of Space Monitoring Viewpoint

Note that the position of the space monitoring viewpoint during jack-out may be determined on the basis of a predetermined condition. For example, the space monitoring viewpoint may be determined on the basis of the arrangement of the moving bodies 2 in the workspace. As an example, the space monitoring viewpoint may be determined to be at a position and an angle of view at which all the moving bodies 2 positioned in the workspace can be monitored.

Alternatively, the space monitoring viewpoint may be determined in accordance with setting information regarding the user 4. Alternatively, the space monitoring viewpoint may be determined on the basis of work (work objective) conducted in the workspace. For example, information regarding a position and an angle of view at the space monitoring viewpoint suitable for the work objective has been stored in advance in the storage unit 122, and then the space monitoring viewpoint may be determined on the basis of the information stored in the storage unit 122. As an example, in a case where the workspace is an "operating room" (during a surgery mode), the space monitoring viewpoint may be defined at a position and an angle of view at which at least the entire surgical table can be monitored. Alternatively, in a case where the workspace is a "kitchen" (during a cooking mode), the space monitoring viewpoint may be defined at a position and an angle of view at which the entire kitchen can be monitored.

Note that a work objective corresponding to the workspace may be selected by the user 4 before the issuance of the "jack-out" command, for example, or the like. Alternatively, the server 10 may automatically determine a work objective on the basis of information indicating contents of work that the moving body 2 is conducting. Alternatively, the server 10 may automatically determine a work objective in accordance with the workspace (the position of the workspace, the type of the workspace, and the like).

(2-1-4-2. During Space Monitoring Viewpoint Mode)

Figure 9:
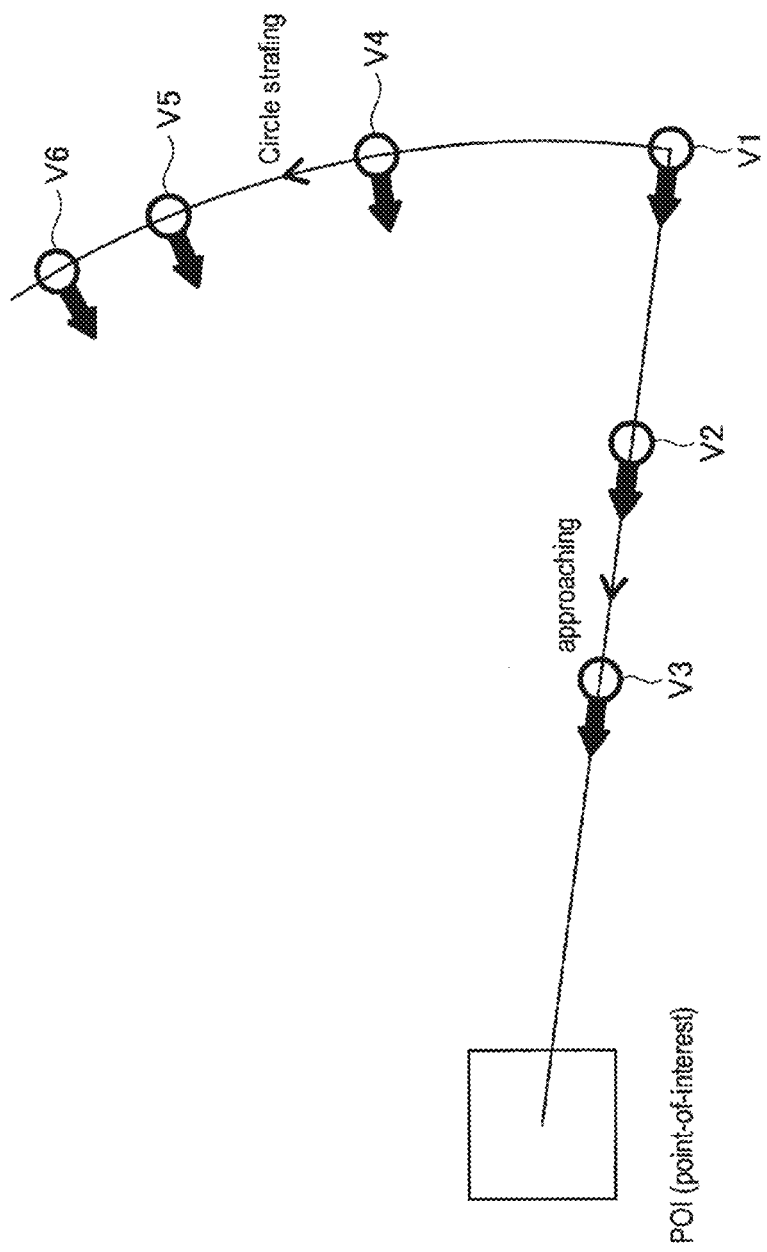
FIG. 9 is an explanatory diagram showing a space monitoring viewpoint moving example based on a point of interest (POI) according to the embodiment.

Moreover, in a case where jack-out is terminated (hereinafter may be referred to as during a space monitoring viewpoint mode), the viewpoint moving unit 106 continuously moves the position of the space monitoring viewpoint on the basis of operation information acquired by the operation information acquisition unit 104. For example, the viewpoint moving unit 106 continuously moves the position of the space monitoring viewpoint on the basis of detection of an operation of navigating a workspace on the basis of a POI, as shown in FIG. 9. For example, in a case where an operation for approaching any POI positioned in the workspace has been detected, the viewpoint moving unit 106 causes the position of the space monitoring viewpoint to continuously approach the POI, while maintaining the direction of the space monitoring viewpoint in a state directed to the POI, for example, like the viewpoints V1, V2, and V3 shown in FIG. 9. In addition, in a case where an operation for rotating around any POI has been detected, the viewpoint moving unit 106 continuously changes the direction of the space monitoring viewpoint such that the direction of the space monitoring viewpoint is maintained in a state directed to the POI, while continuously moving the position of the space monitoring viewpoint rotationally centering on the POI (like circle strafing), for example, like the viewpoints V1, V4, V5, and V6 shown in FIG. 9.

(2-1-4-3. During Jack-in)

Moreover, in a case where the moving body 2 as the "jack-in" target is selected by the user 4, and operation information indicating that the "jack-in" command has been issued is acquired by the operation information acquisition unit 104, the viewpoint moving unit 106 continuously moves the viewpoint position from the space monitoring viewpoint to the moving body viewpoint of the moving body 2 as the "jack-in" target.

Figure 10:
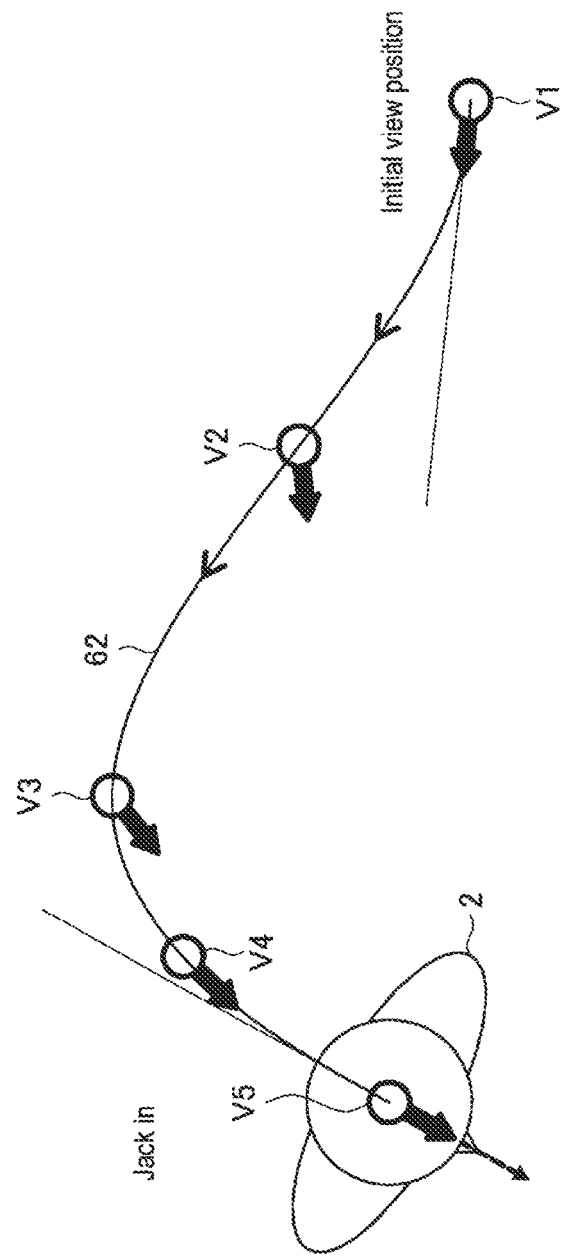
FIG. 10 is an explanatory diagram showing a viewpoint moving example during jack-in according to the embodiment.

Here, with reference to FIG. 10, the above contents will be described in further detail. FIG. 10 is an explanatory diagram showing an example of a moving path (a moving path 62) determined by the viewpoint moving unit 106 in a case where the "jack-in" command has been issued. In this case, for example, the viewpoint moving unit 106 causes the viewpoint V1 at the starting point of the moving path 62 to match with the space monitoring viewpoint (when the "jack-in" command is issued), and causes the viewpoint V5 at the end point of the moving path 62 to match with the moving body viewpoint of the moving body 2 as the "jack-in" target. Then, the viewpoint moving unit 106 determines the moving path 62 by linearly interpolating the viewpoint position such that the viewpoint position changes continuously. For example, as shown in FIG. 10, the viewpoint moving unit 106 may determine the moving path 62 as a Bezier curve.

Further, the viewpoint moving unit 106 may cause the direction of the viewpoint V1 at the starting point of the moving path 62, for example, to match with the direction of the head (or the line-of-sight direction) of the user 4 sensed by the motion capture sensors 34 and the like, for example, and may cause the direction of the viewpoint V5 at the end point of the moving path 62 to match with the direction of the moving body viewpoint of the moving body 2 as the "jack-in" target. Then, the viewpoint moving unit 106 may linearly interpolate the viewpoint direction on the moving path 62 such that the viewpoint direction changes continuously in accordance with the movement of the viewpoint position. According to the above-described determination example, such transition video that a movement is made continuously from the space monitoring viewpoint to the moving body viewpoint of the moving body 2 may be generated. For example, in a case where the moving body 2 as the jack-in target is a person, transition video that may impart such a feeling that the viewpoint position moves continuously from the rear side of the moving body 2 as the "jack-in" target to the head of the moving body 2, and is then integrated into the moving body 2 to the user 4 is generated.

Further, the viewpoint moving unit 106 is also capable of determining the angle of view on the moving path 62 such that the angle of view changes continuously between the starting point and the end point of the moving path 62. For example, in the example shown in FIG. 10, the viewpoint moving unit 106 may cause the angle of view at the viewpoint V at the starting point of the moving path 60 to match with the angle of view at the space monitoring viewpoint, and may cause the angle of view at the viewpoint V5 at the end point of the moving path 60 to match with the angle of view at the moving body viewpoint of the moving body 2 as the "jack-in" target. Then, the viewpoint moving unit 106 may linearly interpolate the angle of view on the moving path 62 such that the angle of view changes continuously in accordance with the movement of the viewpoint position.

In addition, the viewpoint moving unit 106 is capable of determining the viewpoint moving speed such that the moving speed decreases as the viewpoint position on the moving path 62 approaches the end point (similarly to the jack-out case). For example, in the example shown in FIG. 10, the viewpoints V2, V3, V4, and V5 show viewpoints moved along the moving path by the viewpoint moving unit 106 at unit time intervals. For example, the viewpoint moving unit 106 may determine the viewpoint moving speed such that the relationship between the elapsed time and the viewpoint moving speed matches with a predetermined logarithmic function.

[2-1-5. Video Generation Unit 108]

The video generation unit 108 is an example of a display control unit in the present disclosure. The video generation unit 108 generates video to be displayed in a display area that the user 4 visually recognizes.

(2-1-5-1. Moving Body Video)

For example, while the user 4 is performing jack-in in any moving body 2, the video generation unit 108 generates moving body video on the basis of video captured by the camera 200 mounted on the moving body 2. For example, the video generation unit 108 generates a panoramic image (moving body video) on the basis of an image captured by the camera 200. For example, the moving body video may be spherical video in which the user 4 can freely look around an environment around the position of the moving body viewpoint of the moving body 2. This moving body video allows the user 4 to visually recognize video captured at the viewpoint of the moving body 2 during jack-in.

Note that, in a case where the moving body 2 is a person, when the head of the moving body 2 rotates, an undesirable image shake is included in generated moving body video. Then, the user 4 may feel motion sickness while watching such moving body video. Therefore, it is preferable that the video generation unit 108 generates moving body video by subjecting an image captured by the camera 200 to shake correction processing through use of a publicly-known technology, such as the technology described in Patent Literature 1, for example.

For example, the video generation unit 108 estimates the rotation of the head of the moving body 2 between consecutive frames captured by the camera 200. Then, the video generation unit 108 performs a correction of causing each of the frames captured by the camera 200 to counter-rotate in accordance with the total amount of rotation (of the head of the moving body 2) estimated with respect to the frame. Accordingly, an image shake resulting from the rotation of the head of the moving body 2 is suppressed in generated moving body video.

(2-1-5-2. Space Monitoring Video)

Moreover, during the space monitoring viewpoint mode, the video generation unit 108 generates space monitoring video on the basis of the space monitoring viewpoint (the position, direction, and angle of view) determined by the viewpoint moving unit 106 and the point cloud configured by the spatial information acquisition unit 102. In this space monitoring video, the user 4 can overview the workspace, and can monitor the entire workspace, for example. For example, the user 4 can grasp the positional relationship among a plurality of moving bodies 2 positioned in the workspace.

Note that, as a modification, in a case where the moving body 2 in which the user 4 has performed jack-in immediately previously is included in the field of view of the space monitoring viewpoint, the video generation unit 108 may arrange a display explicitly showing the moving body 2 in the space monitoring video.

(2-1-5-3. First Transition Video)

Moreover, in a case where the "jack-out" command has been issued, the video generation unit 108 generates first transition video corresponding to the viewpoint position moved continuously by the viewpoint moving unit 106 from the moving body viewpoint of the moving body 2 in which the user 4 is performing jack-in to the space monitoring viewpoint. In this case, for example, the video generation unit 108 generates first transition video by generating frames at unit intervals on the basis of the viewpoint moved by the viewpoint moving unit 106 and the point cloud configured by the spatial information acquisition unit 102.

Figure 11:
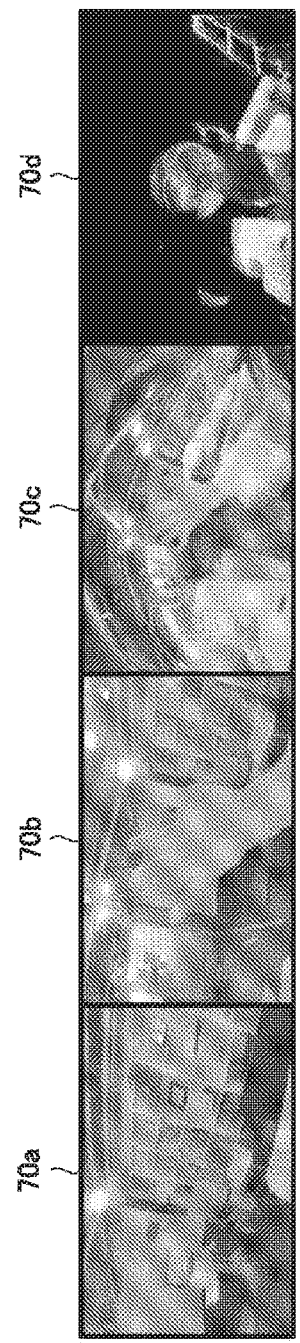
FIG. 11 is an explanatory diagram showing an example of frames included in first transition video generated during jack-out according to the embodiment.

FIG. 11 is a diagram showing an example of four frames included in the generated first transition video. Note that a frame 70a shown in FIG. 11 is the same as moving body video at a time point when the "jack-out" command is issued, for example, and a frame 70d is the same as space monitoring video at a time point when jack-out is terminated. As shown in FIG. 11, a frame 70b and a frame 70c (showing a transition from the frame 70a to the frame 70d) are displayed between the frame 70a and the frame 70d.

This first transition video allows the user 4 to easily understand a change in positional relationship resulting from a transition from the moving body viewpoint of the moving body 2 in which the user 4 has performed jack-in immediately previously to the space monitoring viewpoint.

(2-1-5-4. Second Transition Video)

Moreover, in a case where the moving body 2 as the "jack-in" target is selected by the user 4, and operation information indicating that the "jack-in" command has been issued is acquired by the operation information acquisition unit 104, the video generation unit 108 generates second transition video corresponding to the viewpoint position moved continuously by the viewpoint moving unit 106 from the space monitoring viewpoint to the moving body viewpoint of the moving body 2 as the "jack-in" target. Note that a specific method of generating the second transition video is substantially similar to the first transition video.

Figure 12:
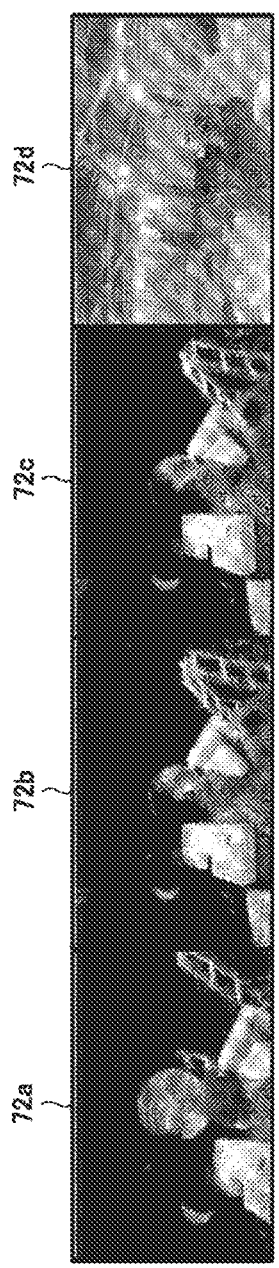
FIG. 12 is an explanatory diagram showing an example of frames included in second transition video generated during jack-in according to the embodiment.

FIG. 12 is a diagram showing an example of four frames included in the generated second transition video. Note that a frame 72a shown in FIG. 12 is the same as space monitoring video at a time point when the "jack-in" command is issued, for example, and a frame 72d is the same as moving body video of the moving body 2 as the "jack-in" target at a time point when jack-in is terminated. As shown in FIG. 12, a frame 72b and a frame 72c (showing a transition from the frame 72a to the frame 72d) are displayed between the frame 72a and the frame 72d.

This second transition video allows the user 4 to easily understand a change in positional relationship resulting from a transition from the space monitoring viewpoint to the moving body viewpoint of the moving body 2 as the "jack-in" target.

[2-1-6. Output Control Unit 110]

(2-1-6-1. Display of Video)

The output control unit 110 is an example of a display control unit in the present disclosure. The output control unit 110 causes video generated by the video generation unit 108 to be displayed in the display area that the user 4 visually recognizes. For example, the output control unit 110 causes the projectors 36 to sequentially project generated video on the screens 38 when moving body video, space monitoring video, first transition video, or second transition video is generated by the video generation unit 108.

(2-1-6-2. "Lock-On" Mark)

Moreover, when space monitoring video is displayed, the output control unit 110 is capable of causing the "lock-on" mark 510 as shown in FIG. 7, for example, to be displayed in an overlapping manner on the space monitoring video. This "lock-on" mark 510 is a display for explicitly showing the moving body 2 selected as a jack-in target by the user 4, for example. However, the "lock-on" mark 510 is not limited to such an example, but may be a UI for the user 4 to select the moving body 2 as the "jack-in" target. In this case, the "lock-on" marks 510 may be displayed for all the moving bodies 2 displayed in the space monitoring video.

(2-1-6-3. UI when Selecting Moving Body 2)

Moreover, when displaying space monitoring video, for example, the output control unit 110 is also capable of causing a UI for the user 4 to select the moving body 2 as the "jack-in" target to be displayed in an overlapping manner on video being displayed. This UI may include, for each moving body 2, information such as information indicating whether or not jack-in is currently possible, the fixed number of users 4 who can perform jack-in in the moving body 2, identification information regarding the users 4 performing jack-in in the moving body 2, and the like, for example. Further, this UI may include a chat UI for chatting with any moving body 2, or may include history information regarding chats between an individual moving body 2 and another user 4b (or the user 4a). Alternatively, this UI may include a phonebook UI for making a call to any moving body 2 (person). For example, the user 4 can talk with any moving body 2 using a headset, a mobile phone, or the like.

(2-1-6-4. Notification to Moving Body 2)

In addition, as a modification, in a case where the moving body 2 as a jack-out target (or jack-in target) is a person, the output control unit 110 is also capable of causing a notification indicating completion of execution of jack-out (or jack-in) to be output to the moving body 2 as the jack-out target (or jack-in target). After jack-out, for example, the output control unit 110 may cause a display, a sound, or a vibration indicating completion of execution of jack-out to be output to the moving body 2 in which the user 4 has performed jack-in immediately previously. Note that, on this occasion, the output control unit 110 may further notify the moving body 2 of identification information regarding the user 4 having performed jack-out. Note that a notification example in the jack-in case may be similar.

[2-1-7. Communication Unit 120]

The communication unit 120 performs information transmission/reception to/from another device capable of communicating with the server 10. For example, the communication unit 120 transmits generated video to the projectors 36 in accordance with the control of the output control unit 110. In addition, the communication unit 120 also receives video captured by the camera 200 mounted on each moving body 2. In addition, the communication unit 120 also receives sensed information from the depth cameras 30, the motion capture sensors 32, the motion capture sensors 34, or the like.

[2-1-8. Storage Unit 122]

The storage unit 122 stores various types of data and various types of software. For example, the storage unit 122 stores a history information DB. In this history information DB, a date and time, identification information regarding the user 4, identification information regarding the moving body 2 in which jack-in or jack-out has been performed by the user 4, information concerning the workspace, and information regarding execution of jack-in or jack-out may be associated, for example. Here, the information concerning the workspace may include information indicating the place of the workspace or information regarding contents of work (for example, a surgery, cooking, or the like) conducted in the workspace, for example. Accordingly, the user 4, for example, can browse desired history information by searching the history information DB using identification information regarding the user 4 or identification information regarding the moving body 2 as a search key. In addition, when browsing history information, it is also possible for the user 4 to newly carry out an instruction about jack-in or jack-out of contents corresponding to the history information.

Note that the control unit 100 is capable of storing the history information in the history information DB each time when jack-in or jack-out is executed, for example.

2-2. Operations

[2-2-1. Overall Flow]

The configuration according to the present embodiment has been described above. Next, an example of a flow of operations according to the present embodiment will be described. Note that hereinafter it is premised on that the server 10 has acquired three-dimensional information regarding the workspace in advance, and then a point cloud has been configured in advance. In addition, it is premised on that, in an initial state, the user 4 is performing jack-in in a certain moving body 2 in the workspace.

Figure 13:
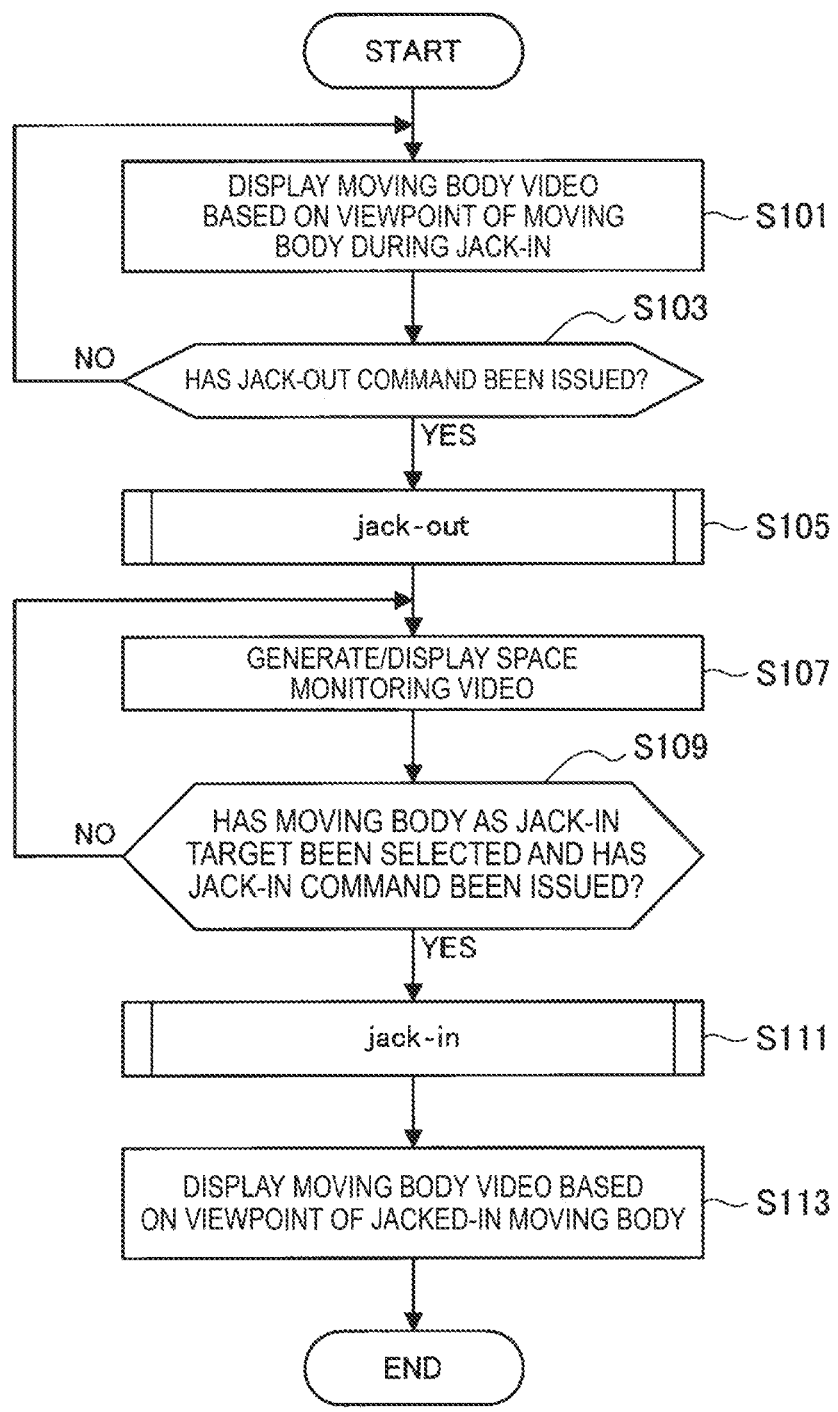
FIG. 13 is a flowchart showing an example of a flow of operations according to the embodiment.

As shown in FIG. 13, first, the video generation unit 108 of the server 10 acquires video captured by the camera 200 mounted on the moving body 2 in which the user 4 is performing jack-in, and then, sequentially generates moving body video on the basis of the acquired video. Then, the output control unit 110 causes the generated moving body video to be sequentially displayed in the display area that the user 4 visually recognizes (S101).

Then, the server 10 determines whether or not the "jack-out" command has been issued by the user 4 (S103). In a case where the "jack-out" command has not been issued (S103: No), the server 10 repeats processing of S101.

On the other hand, in a case where the issuance of the "jack-out" command has been detected (S103: Yes), the server 10 performs "jack-out processing" which will be described later (S105).

Thereafter, the video generation unit 108 sequentially generates space monitoring video on the basis of the space monitoring viewpoint and the point cloud configured in advance by the spatial information acquisition unit 102. Then, the output control unit 110 causes the generated space monitoring video to be displayed in the display area that the user 4 visually recognizes (S107).

Then, the server 10 determines whether or not the moving body 2 as the "jack-in" target has been selected by the user 4 and the "jack-in" command has been issued (S109). In a case where the moving body 2 as the "jack-in" target has not been selected or the "jack-in" command has not been issued (S109: No), the server 10 repeats processing of S107.

On the other hand, in a case where the moving body 2 as the "jack-in" target has been selected and the "jack-in" command has been issued (S109: Yes), the server 10 performs "jack-in processing" which will be described later (S111).

Thereafter, the video generation unit 108 acquires video captured by the camera 200 mounted on the moving body 2 in which jack-in has been performed in S111, and then sequentially generates moving body video on the basis of the acquired video. Then, the output control unit 110 causes the generated moving body video to be sequentially displayed in the display area that the user 4 visually recognizes (S113).

[2-2-2. Jack-Out Processing]

Figure 14:
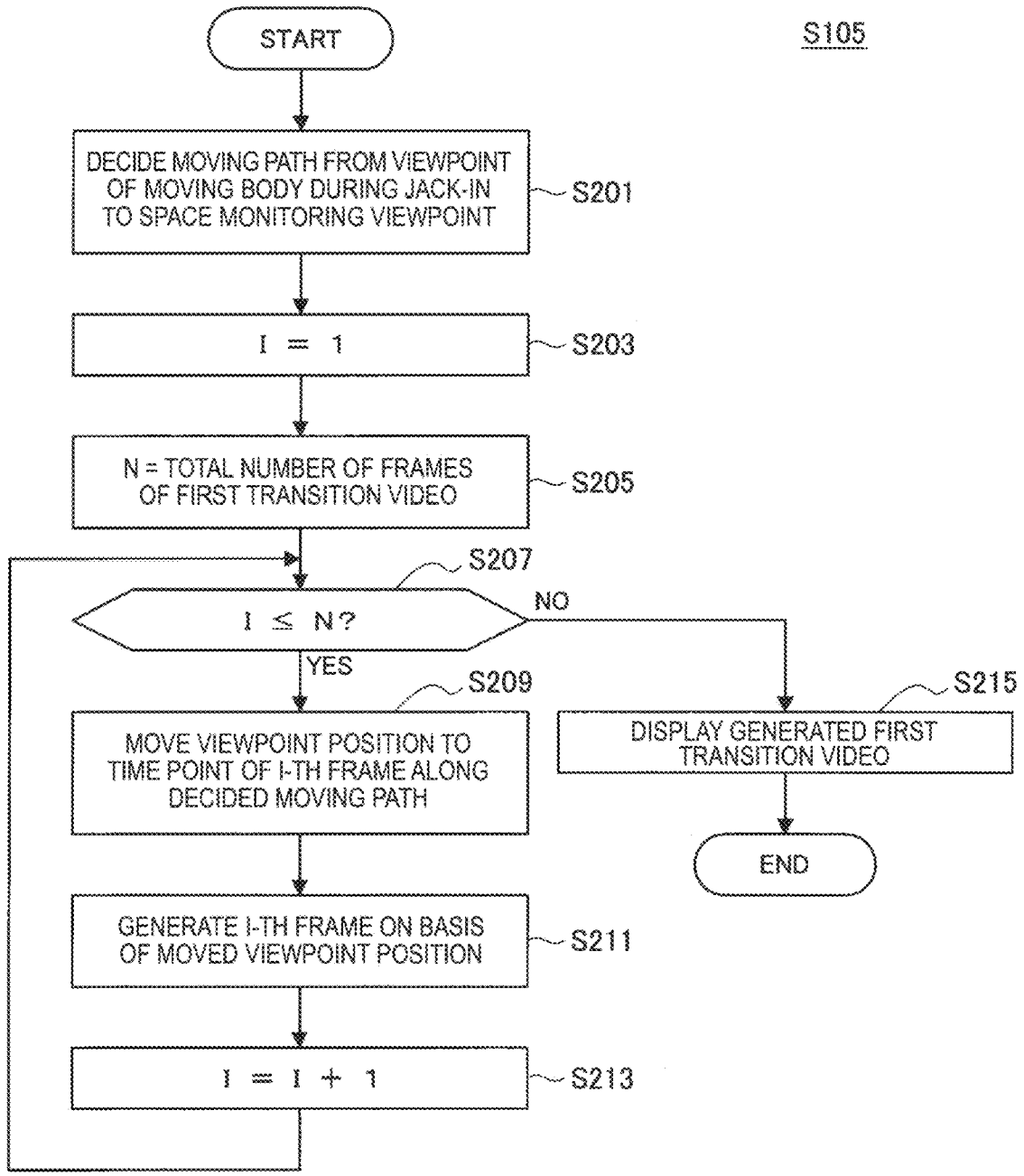
FIG. 14 is a flowchart showing a flow of "jack-out processing" according to the embodiment.

Here, with reference to FIG. 14, contents of the "jack-out processing" in S105 will be described in detail. As shown in FIG. 14, first, the viewpoint moving unit 106 determines a moving path from the moving body viewpoint of the moving body 2 in which the user 4 is performing jack-in to the space monitoring viewpoint, on the basis of the point cloud already configured (S201).

Thereafter, the viewpoint moving unit 106 sets a variable I indicating the number of a frame in a first transition image to be generated at "1" (S203). Then, the viewpoint moving unit 106 sets the total number of frames included in the first transition image to be generated at N (S205).

Subsequently, the viewpoint moving unit 106 determines whether or not I is smaller than or equal to N (S207). In a case where I is smaller than or equal to N (S207: Yes), the viewpoint moving unit 106 moves the viewpoint position to a time point of the I-th frame along the moving path determined in S201. In addition, the viewpoint moving unit 106 determines a direction and an angle of view at the viewpoint at the time point of the I-th frame such that the direction and the angle of view at the viewpoint change continuously in accordance with the movement of the viewpoint position (S209).

Subsequently, the video generation unit 108 generates the I-th frame on the basis of the moved viewpoint position and the point cloud already configured (S211).

Subsequently, the viewpoint moving unit 106 adds "1" to I (S213). Then, the viewpoint moving unit 106 performs the processing of S207 again.

In a case where I is larger than N in S207, that is, in a case where generation of the first transition video has been terminated (S207: No), the output control unit 110 causes the generated first transition video to be displayed in the display area that the user 4 visually recognizes (S215). Then, the server 10 terminates the "jack-out processing."

[2-2-3. Jack-in Processing]

Figure 15:
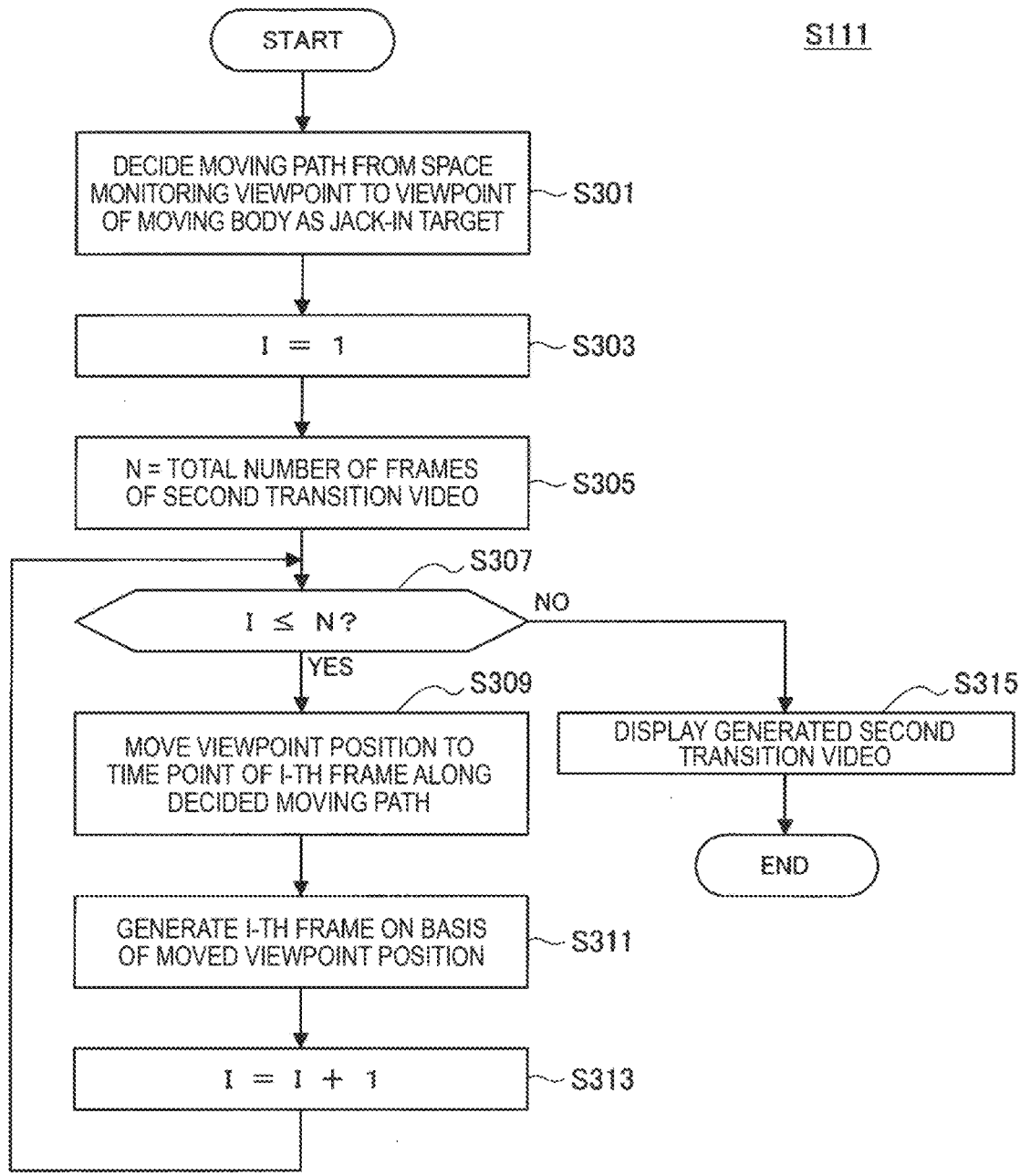
FIG. 15 is a flowchart showing a flow of "jack-in processing" according to the embodiment.

Next, with reference to FIG. 15, contents of the "jack-in processing" in S111 will be described in detail. As shown in FIG. 15, first, the viewpoint moving unit 106 determines a moving path from a current space monitoring viewpoint to the moving body viewpoint of the moving body 2 as the "jack-in" target selected by the user 4 in S109, on the basis of the point cloud already configured (S301).

Note that processing of S303 to S315 shown in FIG. 15 is substantially similar to processing of S203 to S215 in the "jack-out processing."

2-3. Effects

[2-3-1. Effect 1]

As described above, when a movement is made between moving body viewpoints of the moving bodies 2 in the workspace, the server 10 according to the present embodiment causes the movement to pass through a space monitoring viewpoint. Further, when a transition is made between a moving body viewpoint and a space monitoring viewpoint (during jack-out or jack-in), the server 10 generates transition video by continuously moving the viewpoint position between the moving body viewpoint of the moving body 2 and the space monitoring viewpoint on the basis of the point cloud configured in advance, and then causes the generated transition video to be displayed in the display area that the user 4 visually recognizes. Thus, since a viewpoint movement in the workspace can be presented to the user 4 without spatial gaps, the user 4 can easily understand a change in positional relationship resulting from the viewpoint transition.

Note that, in publicly-known technologies, a technology for only providing video based on a moving body viewpoint or a technology for only providing video based on a space monitoring viewpoint has been disclosed. However, a technology for performing a seamless transition between the moving body viewpoint of the moving body 2a and the space monitoring viewpoint, and further achieving entrance into the moving body viewpoint of the other moving body 2b as that of the present embodiment has not been disclosed. The present embodiment enables a transition between viewpoints of a plurality of moving bodies 2 (persons or robots) positioned in a workspace to be performed freely and while maintaining spatial continuity. Consequently, it is easy for the user 4 (observer) positioned remotely to grasp the entire workspace.

[2-3-2. Effect 2]

In addition, the present embodiment is applicable to remote monitoring, a remote operation, and the like for a disaster site and the like, for example. In addition, since the present embodiment enables a cooperation between the moving body 2 and the user 4, it is also applicable to various fields such as a remote surgery and a remote experiment, for example. For example, the user 4 can appropriately provide various working instructions for the moving body 2 by referring to video while switching between moving body video and space monitoring video according to necessity.

[2-3-3. Effect 3]

In addition, according to the present embodiment, a platform for skill transfer can be configured. For example, it is useful for remote learning of skills such as sports, playing a musical instrument, and industrial arts. For example, a teacher (the moving body 2) can exhibit his/her own skill to a remote learner (the user 4), and then the learner can take a look and imitate it. Further, the learner can observe exemplary performance of the teacher from any of the space monitoring viewpoint and the teacher's viewpoint. In addition, in a case where exemplary performance of the teacher is projected on the screens 38 as a life-sized 3D model, the learner can compare his/her own performance with the exemplary performance of the teacher. Further, exemplary performance of the teacher can also be archived, and then packaged as a new interactive textbook for skill transfer.

[2-3-4. Effect 4]

In addition, in a case where the moving body 2 is a person, such first transition video that the user 4 exits from the head of the moving body 2 in which the user 4 is performing jack-in, and then the viewpoint continuously rises rearward and upward with respect to the moving body 2 is generated during jack-out, and is then presented to the user 4. This allows the user 4 to obtain a feeling as if he/she exits the body of the moving body 2.

Further, according to the present embodiment, a platform for studying an artificial out-of-body experience can be configured. For example, since a seamless transition between a moving body viewpoint and a space monitoring viewpoint can be provided for the user 4 in the present embodiment, it is useful for studying cognitive effects concerning out-of-body experiences.

2-4. Application Example

Figure 16:
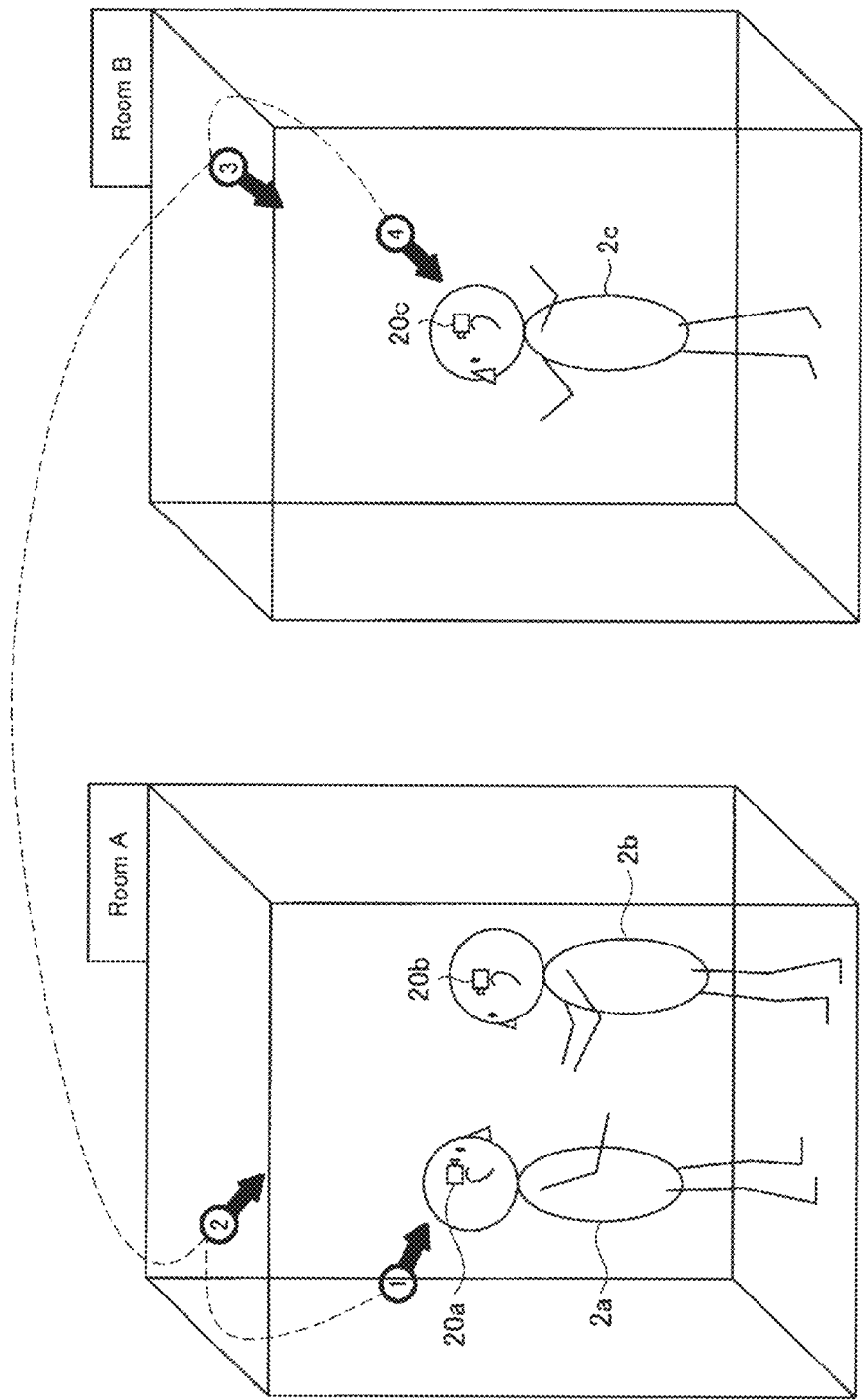
FIG. 16 is an explanatory diagram schematically showing a movement between viewpoints in different workspaces, according to an application example of the embodiment.

The present embodiment has been described above. In the above-described embodiment, an example in which a transition between viewpoints is performed in a single workspace has been basically described above. In the meanwhile, in a case where a plurality of workspaces are provided in advance, it is desirable that a transition between viewpoints in different workspaces can be performed. For example, as shown in FIG. 16, it is desirable that a transition can be performed from the moving body viewpoint of the moving body 2a positioned in a workspace "RoomA" or the space monitoring viewpoint to the moving body viewpoint of a moving body 2c positioned in a workspace "RoomB."

Next, an application example of the present embodiment will be described. As will be described later, according to the present application example, it is possible to generate transition video that continuously connects moving body viewpoints of the moving bodies 2 positioned in different workspaces, and then cause the user 4 to visually recognize the generated transition video. This allows the user 4 to easily understand a change in positional relationship resulting from a viewpoint transition even in a case where the viewpoints are caused to transition between different workspaces.

[2-4-1. Configuration]

First, a configuration of the server 10 according to the present application example will be described in detail. Note that structural elements included in the server 10 according to the present application example are similar to those of the above-described embodiment (shown in FIG. 6). Only structural elements that have different functions from the above-described embodiment will be described below, and description of overlapping contents will be omitted.

(2-4-1-1. Spatial Information Acquisition Unit 102)

The spatial information acquisition unit 102 according to the present application example acquires three-dimensional information and image information sensed in each of a plurality of workspaces. For example, the spatial information acquisition unit 102 receives information regarding RGB-D sensed by the plurality of depth cameras 30 arranged in each of the plurality of workspaces from the plurality of depth cameras 30 in each of the workspaces.

In addition, for each of the workspaces, the spatial information acquisition unit 102 configures a point cloud of the workspace on the basis of the three-dimensional information and image information having been acquired.

(2-4-1-2. Operation Information Acquisition Unit 104)

The operation information acquisition unit 104 according to the present application example acquires information regarding an operation by the user 4 for causing the viewpoint to transition to a viewpoint of a moving body or a space monitoring viewpoint positioned in any of the workspaces during the space monitoring viewpoint mode, for example. Note that, in the present application example, the user 4 can perform an operation of designating the moving body 2 as the jack-in target, for example, an operation for performing a transition to a space monitoring viewpoint in another workspace, or the like.

Selection from List

Figure 17:
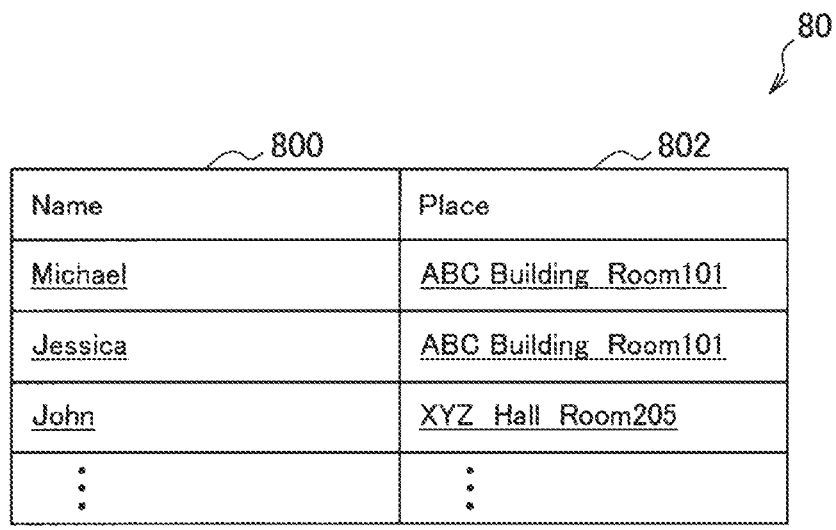
FIG. 17 is an explanatory diagram showing an example of a list for selecting a viewpoint of transition destination, according to an application example of the embodiment.

For example, the operation information acquisition unit 104 is capable of acquiring information regarding an operation of selection from a list presented to the user 4 for causing the viewpoint to transition to a moving body viewpoint or a space monitoring viewpoint positioned in any of the workspaces. For example, a list 80 as shown in FIG. 17 in which identification information 800 regarding the moving bodies 2 and identification information 802 regarding workspaces have been associated may be presented to the user 4. Then, the user 4 can select the moving body 2 as the "jack-in" target from the list 80 and select another workspace from the list 80. Note that the list 80 shown in FIG. 17 shows that a moving body "Michael" and a moving body "Jessica" are positioned in a workspace "ABC Building Room101", and that a moving body "John" is positioned in a workspace "XYZ Hall Room205". In this case, for example, the operation information acquisition unit 104 acquires information regarding an operation in which the user 4 selects the moving body 2 as the "jack-in" target from the list 80. Alternatively, the operation information acquisition unit 104 is also capable of acquiring information regarding an operation in which the user 4 selects the workspace in which the moving body 2 as the "jack-in" target is positioned from the list 80, and then specifying the moving body 2 as the jack-in target on the basis of the acquired information. Alternatively, the operation information acquisition unit 104 acquires information regarding an operation in which the user 4 selects a workspace for causing the viewpoint to transition to a space monitoring viewpoint in another workspace from the list 80.

Selection from Map

Figure 18:
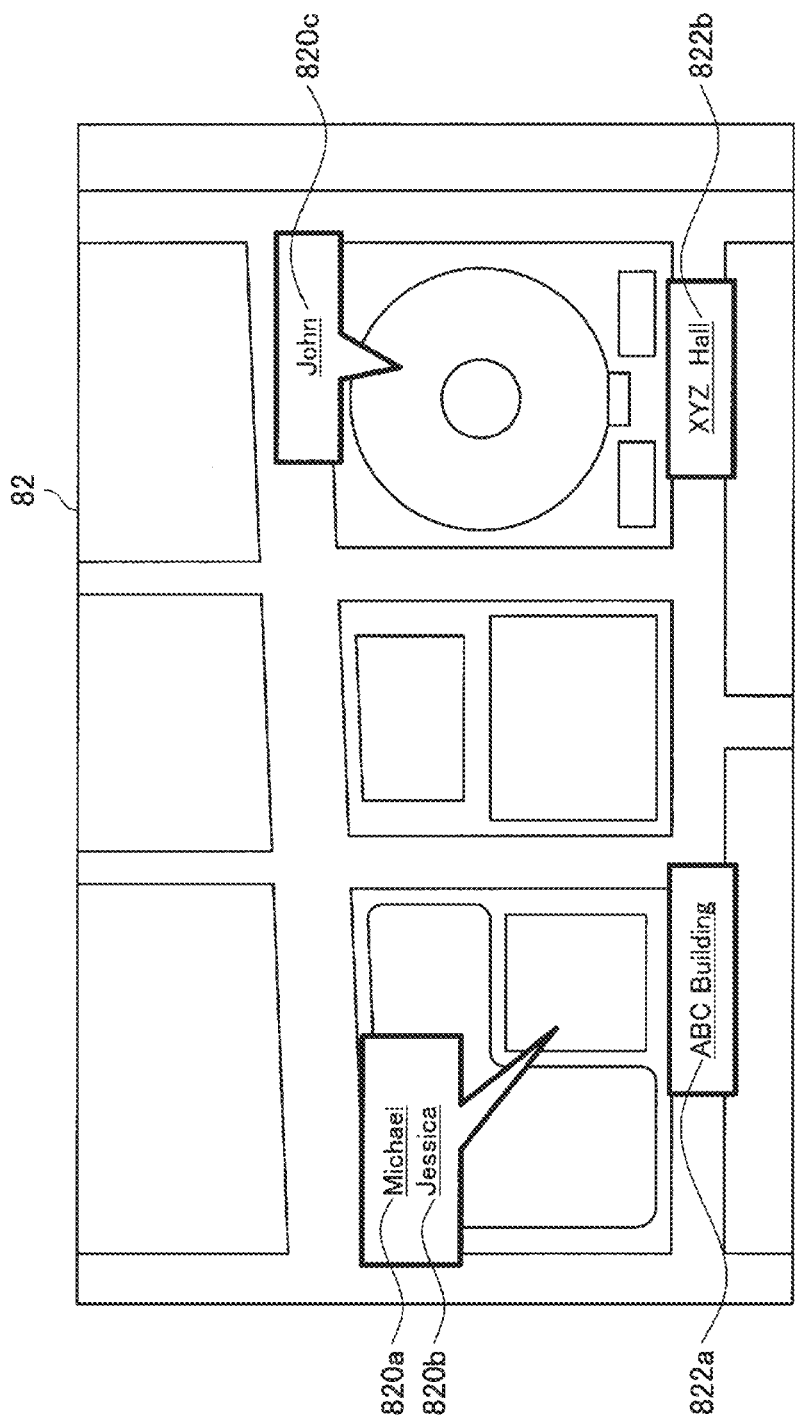
FIG. 18 is an explanatory diagram showing an example of a map for selecting a viewpoint of transition destination, according to an application example of the embodiment.

Alternatively, the operation information acquisition unit 104 is capable of acquiring information regarding an operation of selection from a map presented to the user 4 for causing the viewpoint to transition to a moving body viewpoint or a space monitoring viewpoint positioned in any of the workspaces. For example, a map 82 as shown in FIG. 18 in which identification information 822 regarding the respective workspaces and identification information 820 regarding the moving bodies 2 positioned in the respective workspaces are displayed (in association with positional information regarding the respective workspaces) may be presented to the user 4. Then, the user 4 can select the moving body 2 as the "jack-in" target from the map 82 or select another workspace from the map 82. Note that a specific example of acquiring operation information is similar to the case of the above-described list 80.

(2-4-1-3. Viewpoint Moving Unit 106)

The viewpoint moving unit 106 according to the present application example continuously moves the viewpoint position between a moving body viewpoint or a space monitoring viewpoint in a workspace of a transition destination, specified in accordance with operation information acquired by the operation information acquisition unit 104, and a current viewpoint in a current workspace. For example, in a case where the current viewpoint is the moving body viewpoint of the moving body 2a positioned in a workspace A, and the viewpoint of transition destination is the moving body viewpoint of the moving body 2b positioned in a workspace B, the viewpoint moving unit 106 first determines a moving path that continuously connects in the order of the moving body viewpoint of the moving body 2a, a space monitoring viewpoint in the workspace A, a panoramic map, a space monitoring viewpoint in the workspace B, and the moving body viewpoint of the moving body 2b. Then, the viewpoint moving unit 106 continuously moves the viewpoint position along the determined moving path. Here, the panoramic map is a map showing a positional relationship between the workspace A and the workspace B.

(2-4-1-4. Video Generation Unit 108)

Figure 19:
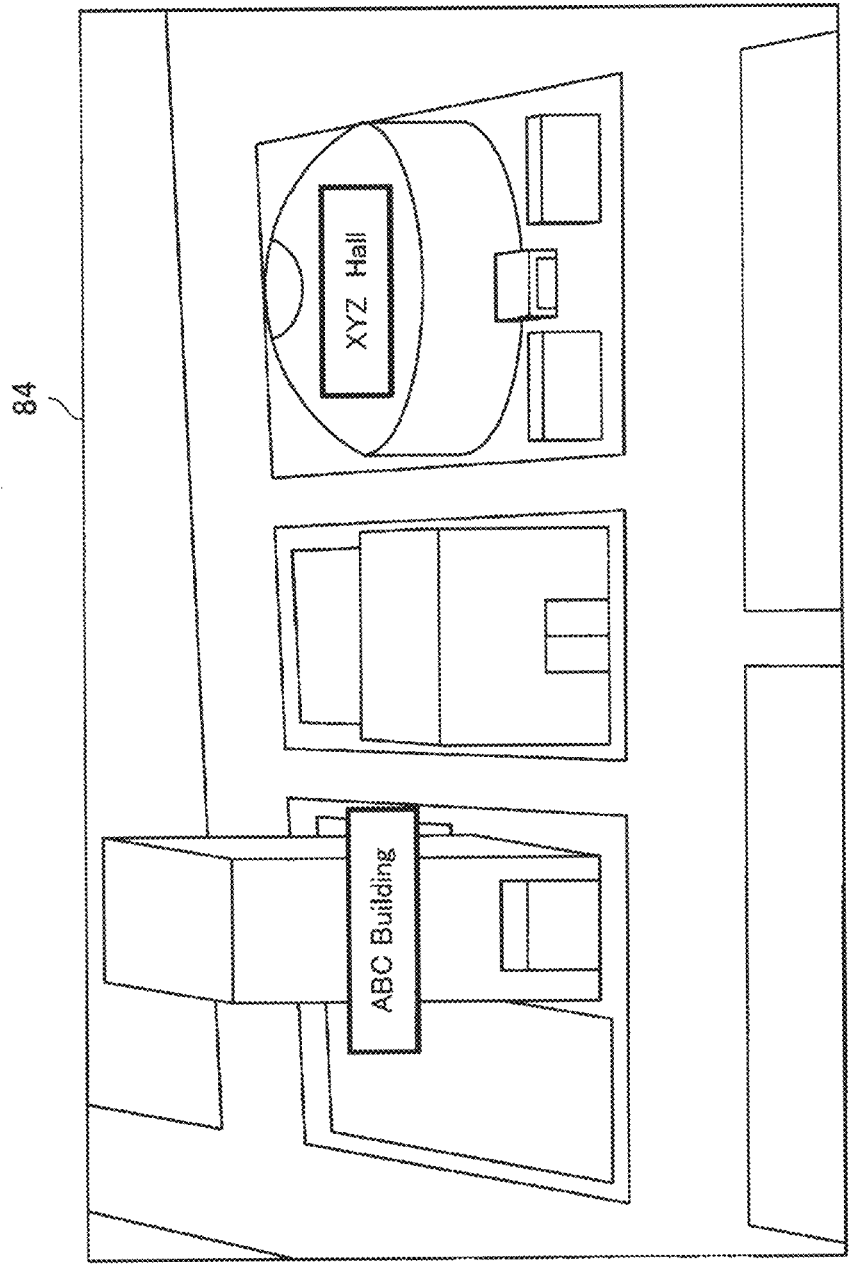
FIG. 19 is an explanatory diagram showing a display example of transition video according to an application example of the embodiment.

In a case where a command for performing jack-out from the current moving body viewpoint in the current workspace (for example, the workspace A) and performing jack-in in the moving body viewpoint of a certain moving body 2b positioned in another workspace (for example, the workspace B), for example, is issued by the user 4, the video generation unit 108 according to the present application example generates transition video corresponding to the viewpoint position moved continuously by the viewpoint moving unit 106. For example, the video generation unit 108 may generate video corresponding to the viewpoint position moved in the order of the space monitoring viewpoint in the workspace A, the panoramic map, and the space monitoring viewpoint in the workspace B among pieces of transition video to be generated, as animation in which the viewpoint is moved in the order of zooming out from the workspace A, scrolling from the workspace A to the workspace B, and zooming in the workspace B. FIG. 19 is an explanatory diagram showing a display example 84 of one frame of this animation. FIG. 19 shows an example of animation when the viewpoint is moved from the workspace "ABC Building" to the workspace "XYZ Hall", for example.

[2-4-2. Effects]

As described above, according to the present application example, transition video that continuously connects moving body viewpoints of the moving bodies 2 positioned in different workspaces is generated, and then the generated transition video is caused to be displayed in the display area that the user 4 visually recognizes. Accordingly, even in a case where the viewpoint is caused to transition between different workspaces, the user 4 can easily understand a change in positional relationship resulting from the viewpoint transition.

[2-4-3. Modification]

Note that the above description has been directed to an example of generating transition video including a panoramic map in a case where a plurality of workspaces are defined, whilst the present application example is not limited to such an example. For example, in a case where the moving body 2a in which the user 4 is currently performing jack-in and the moving body 2b as a new jack-in target have a predetermined positional relationship, the server 10 is capable of performing generation of the above-described transition video and display control. Here, for example, the predetermined positional relationship may be a case in which the moving body 2a and the moving body 2b are apart from each other by a predetermined threshold value or more, or a case in which a shield (for example, a wall) exists between the moving body 2a and the moving body 2b.

3. Hardware Configuration

Figure 20:
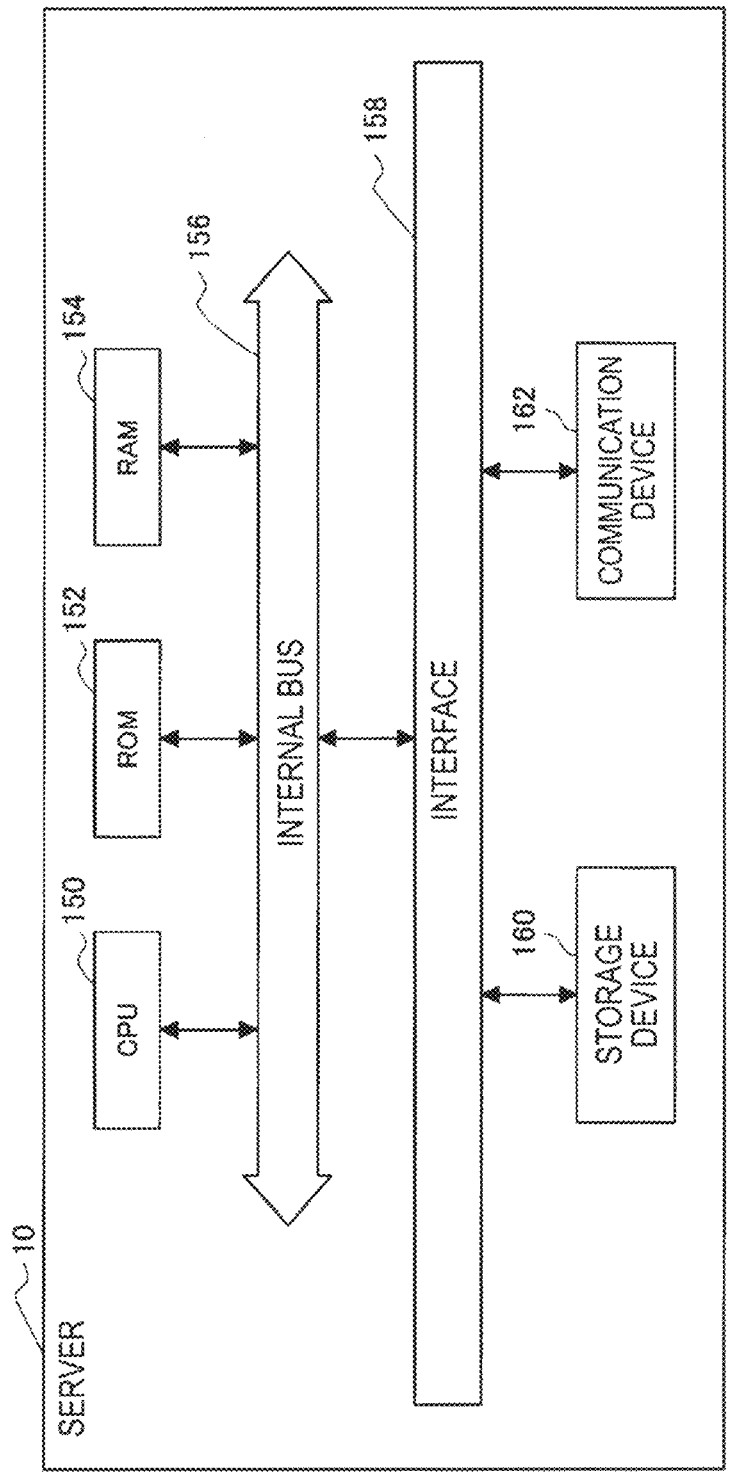
FIG. 20 is an explanatory diagram showing a hardware configuration example of the server 10 according to the embodiment.

Next, a hardware configuration of the server 10 according to the present embodiment will be described with reference to FIG. 20. As shown in FIG. 20, the server 10 includes the CPU 150, a ROM 152, the RAM 154, an internal bus 156, an interface 158, a storage device 160, and a communication device 162.

The CPU 150 functions as an arithmetic processing device and a control device, and controls the overall operation in the server 10 according to various programs. Further, the CPU 150 implements the functions of the control unit 100 in the server 10. Note that the CPU 150 includes a processor such as a microprocessor.

The ROM 152 stores control data such as programs and operation parameters used by the CPU 150, and the like.

The RAM 154 temporarily stores programs, or the like executed by the CPU 150, for example.

The internal bus 156 includes a CPU bus, or the like. This internal bus 156 interconnects the CPU 150, the ROM 152, and the RAM 154 to one another.

The interface 158 connects the storage device 160 and the communication device 162 to the internal bus 156. For example, the storage device 160 exchanges data with the CPU 150 via this interface 158 and the internal bus 156.

The storage device 160 is a data storing device that functions as the storage unit 122. The storage device 160 includes a recording medium, a recording device that records data in the recording medium, a readout device that reads out data from the recording medium, a deletion device that deletes data recorded in the recording medium, and the like, for example.

The communication device 162 is a communication interface including a communication device for connecting to a communication network such as a public network or the Internet, for example, or the like. In addition, the communication device 162 may be a communication device compatible with a wireless local area network (IAN), a communication device compatible with a long term evolution (LTE), or a wired communication device that communicates with wire. This communication device 162 functions as the communication unit 120.

4. Modifications

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

<4-1. Modification 1>

For example, in the above-described embodiment, an example where, in a case where the moving body 2 is a person, the moving body 2 wears the headset 20 (as shown in FIG. 2) has been described, but such an example is not a limitation, and it is also possible to wear an omnidirectional camera.

Note that, in a case where the moving body 2 wears a publicly-known omnidirectional camera on the head, it is possible to generate moving body video of the entire circumference of the moving body 2. However, stereoscopic vision cannot be achieved.

Figure 21:
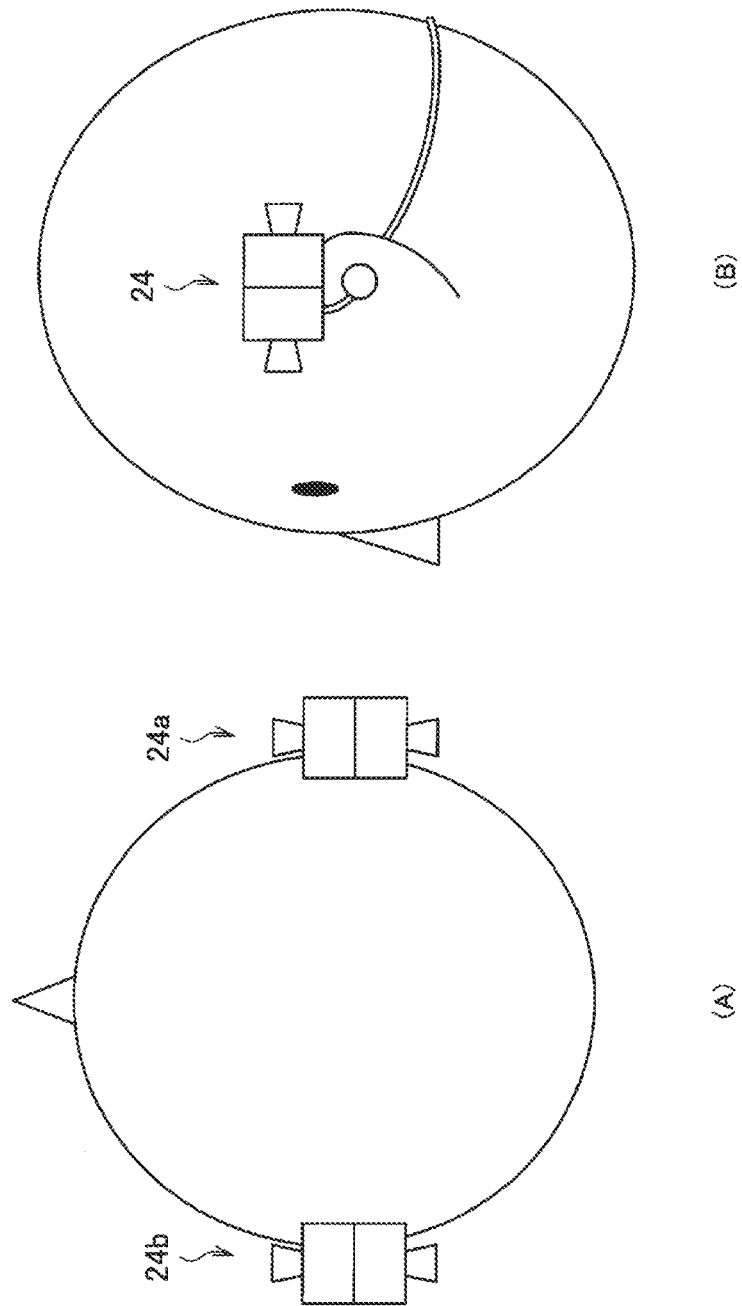
FIG. 21 is an external view of omnidirectional cameras 24 mounted on the moving body 2, according to a modification of the embodiment.
Figure 22:
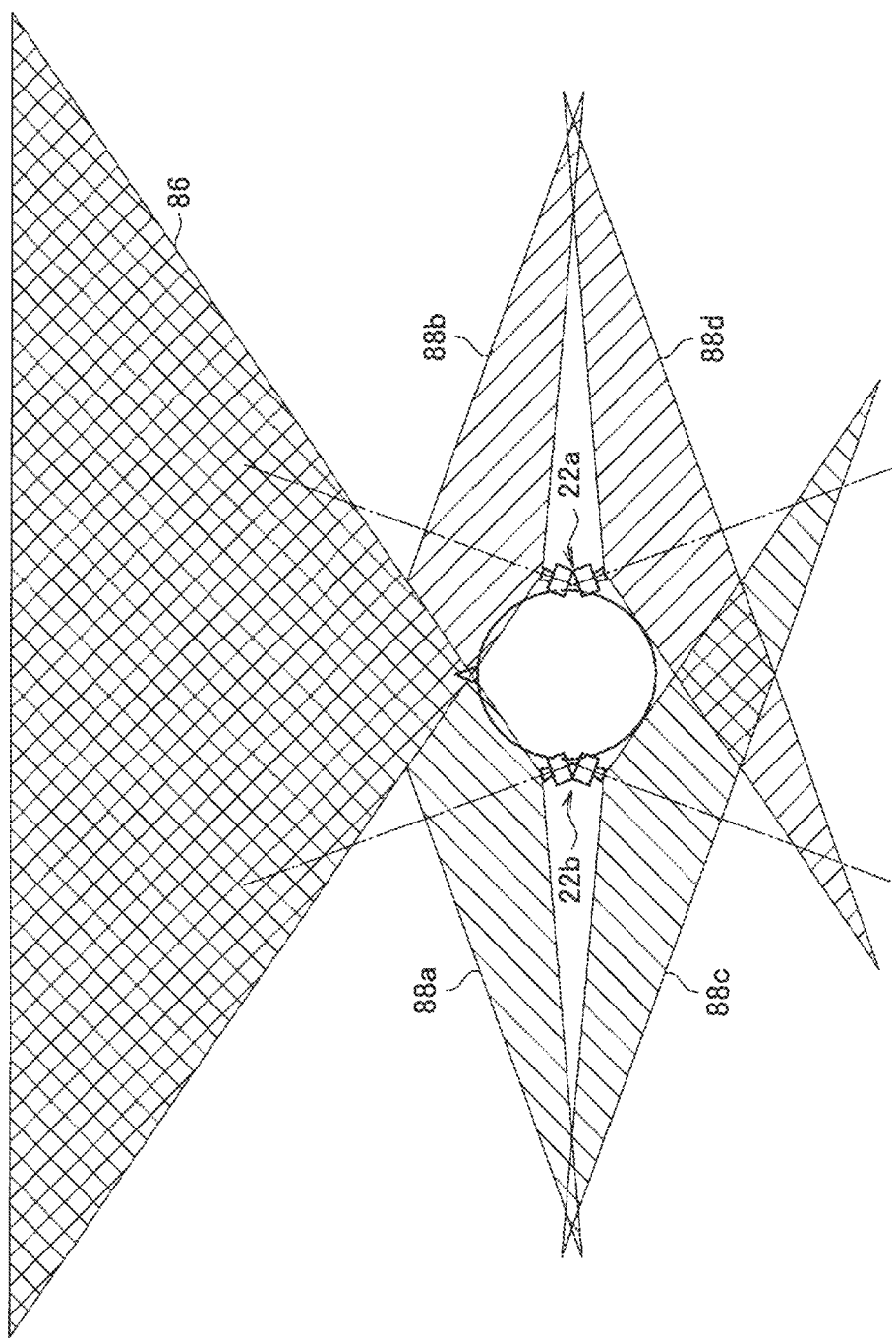
FIG. 22 is an explanatory diagram showing an imaging area by the omnidirectional camera 24.

In the meanwhile, considering application such as a working support through use of moving body video, it is useful if the forward direction of the moving body 2 can be viewed stereoscopically. Therefore, as a modification, the moving body 2 may wear the omnidirectional camera 24 as shown in FIG. 21, for example, on the left and right of the head (on the ears). This omnidirectional camera 24 includes a camera having a viewing angle exceeding 180°, for example, and a marker for position tracking. When these omnidirectional cameras 24 are mounted on the left and right of the head, an imaging area 86 in the forward direction of the moving body 2 and an imaging area 88 in the lateral direction and the rearward direction of the moving body 2 can be imaged as shown in FIG. 22, for example. Then, since the imaging area 86 in the forward direction is imaged by two (left and right) omnidirectional cameras 24 as shown in FIG. 22, binocular stereopsis is made possible.

This modification allows the user 4 to visually recognize moving body video in which the forward direction of the moving body 2 can be viewed stereoscopically. Consequently, it is useful in a scene such as a working support through use of moving body video. Note that, in a case where stereopsis is unnecessary, an imaging range of the omnidirectional camera 24 mounted on one side of the head should only be restricted, and then even in this case, video of the entire circumference of the moving body 2 can be acquired.

<4-2. Modification 2>

Moreover, it is not necessary for the information processing system according to the present embodiment to have the motion capture sensors 32. This is because the server 10 can specify the direction of the moving body viewpoint of each moving body 2 (the moving direction of the moving body 2) in a workspace on the basis of a point cloud configured on the basis of sensing by the plurality of depth cameras 30 and video captured by the camera 200 mounted on each moving body 2.

In addition, as another modification, the user 4 may wear a head mounted display (HMD) capable of communicating with the server 10, instead of installing the plurality of projectors 36 and the plurality of screens 38. Here, the HMD is an example of a display area in the present disclosure. This modification allows the user 4 to visually recognize video transmitted from the server 10 by the HMD.

Further, in this modification, motions of the head, eyes, and the like of the user 4 may be sensed by the HMD. Then, in this case, the motion capture sensors 34 may not be installed.

<4-3. Modification 3>

[4-3-1. Self-Propelled Depth Camera 90]

Figure 23:
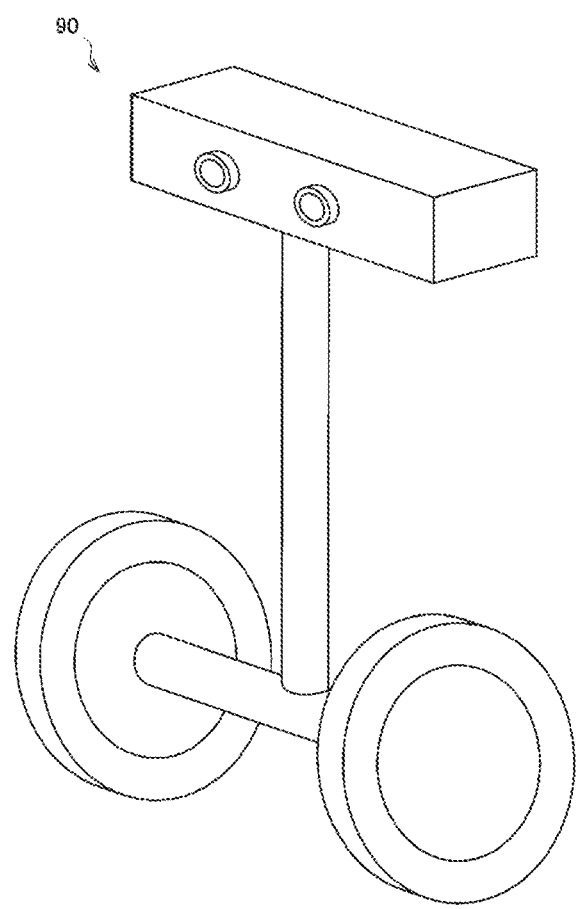
FIG. 23 is a schematic diagram of a self-propelled depth camera 90 according to a modification of the embodiment.

In addition, in the above-described embodiment, an example in which three-dimensional information regarding a workspace is sensed by the plurality of depth cameras 30 installed in the workspace has been described, but such an example is not a limitation. For example, three-dimensional information regarding the workspace may be sensed by the self-propelled depth camera 90 as shown in FIG. 23 capable of freely moving in the workspace. For example, the self-propelled depth camera 90 may be a self-driving vehicle to which a depth camera has been attached.

[4-3-2. Mounted-Type Depth Camera 92]

Figure 24:
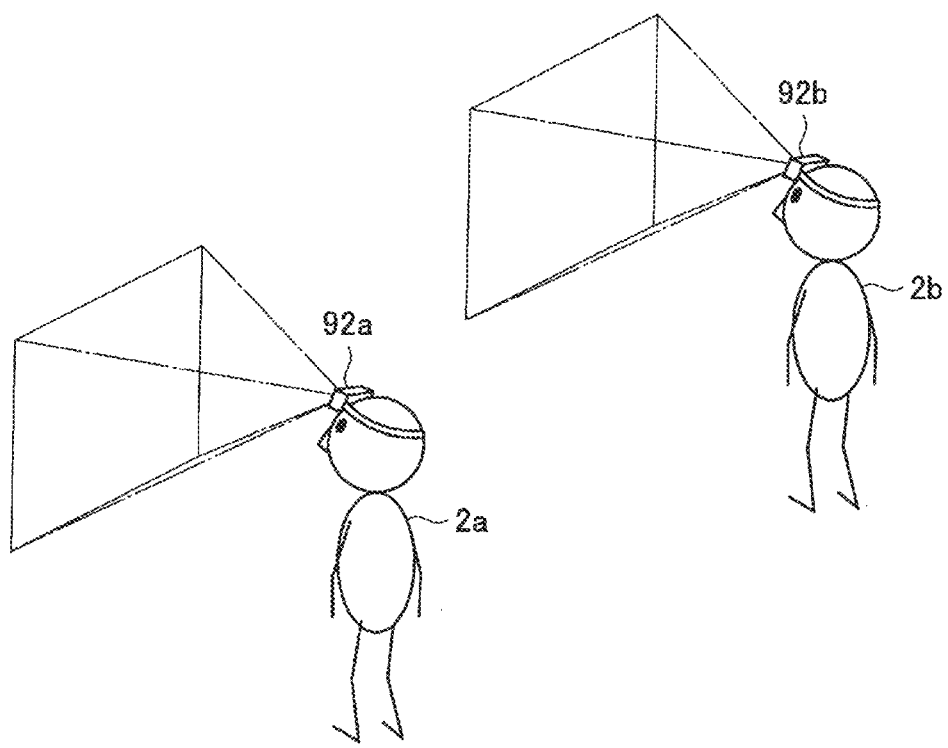
FIG. 24 is a schematic diagram of mounted-type depth cameras 92 mounted on the moving bodies 2, according to a modification of the embodiment.

Alternatively, three-dimensional information regarding the workspace may be sensed by mounted-type depth cameras 92 mounted on the moving bodies 2 as shown in FIG. 24. In this modification, the server 10 sequentially configures a point cloud as each moving body 2 moves in the workspace. Note that, since three-dimensional information can be acquired from the moving body viewpoint of the moving body 2 in this modification, the moving body viewpoint also serves as a space monitoring viewpoint. Consequently, this modification allows the server 10 to generate moving body video as video like space monitoring video.

Alternatively, when any two or more of the (stationary) depth camera 30, the self-propelled depth camera 90, and the mounted-type depth camera 92 are used in combination, three-dimensional information regarding the workspace can also be sensed.

<4-4. Modification 4>

4-4-1. Restricted Example 1

In addition, as another modification, the server 10 is also capable of restricting execution of jack-out or jack-in in a case where a predetermined condition is satisfied. Here, the predetermined condition is a case where, when generating space monitoring video, three-dimensional information concerning the workspace has not been acquired sufficiently, for example. Note that, in this case, the server 10 may cause an error display or a sound to be output when the "jack-out" command or the "jack-in" command is issued, for example, or the like.

Alternatively, the server 10 may move the space monitoring viewpoint while outputting an error and to a position where three-dimensional information has been acquired sufficiently. Then, the server 10 is capable of generating space monitoring video on the basis of the space monitoring viewpoint after the movement.

Alternatively, in the case where the self-propelled depth camera 90 or the mounted-type depth camera 92 according to the above-described modification 3 is used, the server 10 may move the self-propelled depth camera 90 or the moving body 2 wearing the mounted-type depth camera 92 such that three-dimensional information is acquired sufficiently. Then, the server 10 is capable of generating space monitoring video on the basis of the newly acquired three-dimensional information.

Alternatively, in a case where some shield exists in the workspace, the server 10 may cause some robot to move the shield.

4-4-2. Restricted Example 2

Alternatively, the above-described predetermined condition may be a case in which the moving body 2 or an administrator prohibits jack-out or jack-in. According to this condition, in a case where the moving body 2 is a person, for example, it is possible for the moving body 2 to partly restrict jack-in in terms of privacy.

4-4-3. Restricted Example 3

Alternatively, the above-described predetermined condition may be a case in which the moving body 2 is significantly moving his/her head or the like, for example. According to this condition, in a case where it is estimated that motion sickness that the user 4 feels when performing jack-out from the moving body 2 or performing jack-in in the moving body 2 increases, it is possible to impose a restriction such that jack-out and jack-in are not executed.

Note that, in this case, when the "jack-out" command or the "jack-in" command, for example, is issued by the user 4, the server 10 is also capable of temporarily suspending execution of jack-out or jack-in, and then executing jack-out or jack-in when the motion of the head or the like of the moving body 2 settles.

<4-5. Modification 5>

In addition, in the above-described embodiment, an example in which the information processing apparatus in the present disclosure is the server 10 has been described, but such an example is not a limitation. For example, the information processing apparatus may be a personal computer (PC), a smartphone, a tablet terminal, an HMD, a game console, or the like.

In addition, according to the above-described embodiment, a computer program for causing hardware such as the CPU 150, the ROM 152, and the RAM 154 to exert functions equivalent to the respective components of the server 10 according to the above-described embodiment can also be provided. In addition, a recording medium having the computer program recorded thereon is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a display control unit configured to cause first video to be displayed in a display area that a user visually recognizes, the first video being captured by a first imaging unit mounted on a first moving body that moves in a first space, in which the display control unit generates first transition video corresponding to a viewpoint position that is moved continuously between a first viewpoint which is a viewpoint of the first imaging unit and a second viewpoint for imaging the first space.

(2)

The information processing apparatus according to (1), further including:

a spatial information acquisition unit configured to acquire three-dimensional information regarding the first space; and a viewpoint moving unit configured to, on the basis of the three-dimensional information regarding the first space acquired by the spatial information acquisition unit, continuously move the viewpoint position between the first viewpoint and the second viewpoint, in which the display control unit generates the first transition video on the basis of a movement of the viewpoint position by the viewpoint moving unit.

(3)

The information processing apparatus according to (2), further including:

an operation information acquisition unit configured to acquire information regarding detection of a first operation by the user for a movement from the first viewpoint to the second viewpoint, in which when the first operation is detected, the display control unit generates the first transition video, and causes the generated first transition video to be displayed in the display area.

(4)

The information processing apparatus according to (3), in which the viewpoint moving unit determines a moving path of the viewpoint position on which the first viewpoint serves as a starting point and the second viewpoint serves as an end point, and continuously moves the viewpoint position along the determined moving path.

(5)

The information processing apparatus according to (4), in which the viewpoint moving unit further determines a viewpoint direction on the moving path such that the viewpoint direction changes continuously in accordance with the movement of the viewpoint position.

(6)

The information processing apparatus according to (5), in which the viewpoint moving unit causes the viewpoint direction at the starting point of the moving path to match with a direction of the first viewpoint, and causes the viewpoint direction at the end point of the moving path to match with a direction of the second viewpoint.

(7)

The information processing apparatus according to (5) or (6), in which the viewpoint moving unit further determines an angle of view of a viewpoint on the moving path such that the angle of view at the viewpoint changes continuously in accordance with the movement of the viewpoint position.

(8)

The information processing apparatus according to any one of (4) to (7), in which the viewpoint moving unit changes a moving speed of the viewpoint position on the basis of a positional relationship between a current viewpoint position and a position of the end point on the moving path.

(9)

The information processing apparatus according to (8), in which the viewpoint moving unit decreases the moving speed of the viewpoint position as a distance between the current viewpoint position and the position of the end point on the moving path is shorter.

(10)

The information processing apparatus according to (8) or (9), in which the viewpoint moving unit determines the moving speed of the viewpoint position such that a relationship between an elapsed time and the moving speed of the viewpoint position becomes non-linear.

(11)

The information processing apparatus according to any one of (4) to (10), in which the second viewpoint is positioned rearward and upward with respect to the first moving body in the first space, and the second viewpoint is directed to the first moving body.

(12)

The information processing apparatus according to any one of (4) to (11), in which after the movement from the first viewpoint to the second viewpoint, the operation information acquisition unit further acquires information regarding detection of a second operation in which the user selects a second moving body, and the display control unit generates second transition video corresponding to the viewpoint position moved continuously between the second viewpoint and a third viewpoint which is a viewpoint of a second imaging unit mounted on the second moving body selected by the second operation, and causes the generated second transition video to be displayed in the display area.

(13)

The information processing apparatus according to (12), in which the second moving body is positioned in the first space, and the second operation is an operation in which the user selects any of the one or more second moving bodies.

(14)

The information processing apparatus according to (12) or (13), in which the viewpoint moving unit further determines a second moving path of the viewpoint position on which the second viewpoint serves as a starting point and the third viewpoint serves as an end point, and continuously moves the viewpoint position along the determined second moving path, and the display control unit generates the second transition video on the basis of a movement of the viewpoint position along the second moving path.

(15)

The information processing apparatus according to (14), in which the viewpoint moving unit further determines a viewpoint direction on the second moving path such that the viewpoint direction changes continuously in accordance with the movement of the viewpoint position along the second moving path.

(16)

The information processing apparatus according to (15), in which the viewpoint moving unit causes the viewpoint direction at the starting point of the second moving path to match with a direction of the user when the second operation is detected, and causes the viewpoint direction at the end point of the second moving path to match with a direction of the third viewpoint.

(17)

The information processing apparatus according to any one of (12) to (16), in which in a case where the second moving body selected by the second operation is positioned in a second space, the display control unit causes space moving video to be displayed in the display area, the space moving video being based on a continuous movement of the viewpoint position from the second viewpoint to a fourth viewpoint for imaging the second space, and after the space moving video is terminated, the display control unit causes second transition video to be displayed in the display area, the second transition video corresponding to the viewpoint position moved continuously between the fourth viewpoint and the third viewpoint which is the viewpoint of the second imaging unit mounted on the second moving body selected by the second operation.

(18)

The information processing apparatus according to (17), in which the space moving video is video showing a positional relationship between the first space and the second space.

(19)

An information processing method including:

causing first video to be displayed in a display area that a user visually recognizes, the first video being captured by a first imaging unit mounted on a first moving body that moves in a first space; and generating, by a processor, first transition video corresponding to a viewpoint position that is moved continuously between a first viewpoint which is a viewpoint of the first imaging unit and a second viewpoint for imaging the first space.

(20)

A program for causing a computer to function as a display control unit configured to cause first video to be displayed in a display area that a user visually recognizes, the first video being captured by a first imaging unit mounted on a first moving body that moves in a first space, in which the display control unit generates first transition video corresponding to a viewpoint position that is moved continuously between a first viewpoint which is a viewpoint of the first imaging unit and a second viewpoint for imaging the first space.

REFERENCE SIGNS LIST 2 moving body
4 user
10 server
20 headset
24 omnidirectional camera
30 depth camera 32, 34 motion capture sensor
36 projector
38 screen
90 self-propelled depth camera
92 mounted-type depth camera
100 control unit
102 spatial information acquisition unit
104 operation information acquisition unit
106 viewpoint moving unit
108 video generation unit
110 output control unit
120 communication unit
122 storage unit

The invention claimed is:

1. An information processing apparatus comprising:
a circuitry configured to
cause a first video to be displayed in a display area that a user visually recognizes, the first video being captured by a first imaging unit mounted on a first moving body that moves in a first space,
acquire three-dimensional information regarding the first space,
detect a first operation by the user for a movement from a first viewpoint which is a viewpoint of the first imaging unit to a second viewpoint for imaging the first space;
when the first operation is detected, generate a first transition video corresponding to a viewpoint position that is moved continuously along a moving path between the first viewpoint and the second viewpoint, based at least in part on the acquired three-dimensional information, wherein the first viewpoint serves as a starting point and the second viewpoint serves as an end point of the moving path;
cause the generated first transition video to be displayed in the display area;
after the movement from the first viewpoint to the second viewpoint, detect a second operation in which the user selects a second moving body;
generate a second transition video corresponding to the viewpoint position moved continuously between the second viewpoint and a third viewpoint which is a viewpoint of a second imaging unit mounted on the second moving body selected by the second operation; and
cause the generated second transition video to be displayed in the display area, wherein, in a case where the second moving body selected by the second operation is positioned in a second space, a space moving video is displayed in the display area, the space moving video being based on a continuous movement of the viewpoint position from the second viewpoint to a fourth viewpoint for imaging the second space, and after the space moving video is terminated, the second transition video is displayed in the display area, the second transition video corresponding to the viewpoint position moved continuously between the fourth viewpoint and the third viewpoint.

2. The information processing apparatus according to claim 1, wherein the circuitry is further configured to:
determine a viewpoint direction on the moving path such that the viewpoint direction changes continuously in accordance with the movement of the viewpoint position.

3. The information processing apparatus according to claim 2, wherein the circuitry is further configured to:
cause the viewpoint direction at the starting point of the moving path to match with a direction of the first viewpoint, and causes the viewpoint direction at the end point of the moving path to match with a direction of the second viewpoint.

4. The information processing apparatus according to claim 2, wherein the circuitry is further configured to:
determine an angle of view of a viewpoint on the moving path such that the angle of view at the viewpoint changes continuously in accordance with the movement of the view point position.

5. The information processing apparatus according to claim 1, wherein the circuitry is further configured to:
change a moving speed of the viewpoint position on a basis of a positional relationship between a current viewpoint position and a position of the end point on the moving path.

6. The information processing apparatus according to claim 5, wherein the circuitry is further configured to:
decrease the moving speed of the viewpoint position as a distance between the current viewpoint position and the position of the end point on the moving path is shorter.

7. The information processing apparatus according to claim 5, wherein the circuitry is further configured to:
determine the moving speed of the viewpoint position such that a relationship between an elapsed time and the moving speed of the viewpoint position becomes non-linear.

8. The information processing apparatus according to claim 1, wherein
the second viewpoint is positioned rearward and upward with respect to the first moving body in the first space, and
the second viewpoint is directed to the first moving body.

9. The information processing apparatus according to claim 1, wherein
the second moving body is positioned in the first space, and
the second operation is an operation in which the user selects any of the one or more second moving bodies.

10. The information processing apparatus according to claim 1, wherein the circuitry is further configured to:
determine a second moving path of the viewpoint position on which the second viewpoint serves as a starting point and the third viewpoint serves as an end point, and continuously moves the viewpoint position along the determined second moving path, and
generate the second transition video on a basis of a movement of the viewpoint position along the second moving path.

11. The information processing apparatus according to claim 10, wherein the circuitry is further configured to:
determine a viewpoint direction on the second moving path such that the viewpoint direction changes continuously in accordance with the movement of the viewpoint position along the second moving path.

12. The information processing apparatus according to claim 11, wherein the circuitry is further configured to:
cause the viewpoint direction at the starting point of the second moving path to match with a direction of the user when the second operation is detected, and causes the viewpoint direction at the end point of the second moving path to match with a direction of the third viewpoint.

13. The information processing apparatus according to claim 1, wherein the space moving video is video showing a positional relationship between the first space and the second space.

14. An information processing method comprising:

causing g first video to be displayed in a display area that a user visually recognizes, the first video being captured by a first imaging unit mounted on a first moving body that moves in a first space;

acquiring three-dimensional information regarding the first space;

detecting a first operation by the user for a movement from a first viewpoint which is a viewpoint of the first imaging unit to a second viewpoint for imaging the first space, when the first operation is detected, generating, by a processor, a first transition video corresponding to a viewpoint position that is moved continuously along a moving path between the first viewpoint and the second viewpoint, based at least in part on the acquired three-dimensional information, wherein the first viewpoint serves as a starting point and the second viewpoint serves as an end point of the moving path;

causing the generated first transition video to be displayed in the display area;

after the movement from the first viewpoint to the second viewpoint, detecting a second operation in which the user selects a second moving body;

generating a second transition video corresponding to the viewpoint position moved continuously between the second viewpoint and a third viewpoint which is a viewpoint of a second imaging unit mounted on the second moving body selected by the second operation; and causing the generated second transition video to be displayed in the display area, wherein, in a case where the second moving body selected by the second operation is positioned in a second space, a space moving video is displayed in the display area, the space moving video being based on a continuous movement of the viewpoint position from the second viewpoint to a fourth viewpoint for imaging the second space, and after the space moving video is terminated, the second transition video is displayed in the display area, the second transition video corresponding to the viewpoint position moved continuously between the fourth viewpoint and the third viewpoint.

15. A computer readable medium comprising a memory and storing a program for causing a computer to:

cause a first video to be displayed in a display area that a user visually recognizes, the first video being captured by a first imaging unit mounted on a first moving body that moves in a first space;

acquire three-dimensional information regarding the first space;

detect a first operation by the user for a movement from a first viewpoint which is a viewpoint of the first imaging unit to a second viewpoint for imaging the first space;

when the first operation is detected, generate a first transition video corresponding to a viewpoint position that is moved continuously along a moving path between the first viewpoint and the second viewpoint, based at least in part on the acquired three-dimensional information, wherein the first viewpoint serves as a starting point and the second viewpoint serves as an end point of the moving path;

cause the generated first transition video to be displayed in the display area;

after the movement from the first viewpoint to the second viewpoint, detect a second operation in which the user selects a second moving body;

generate a second transition video corresponding to the viewpoint position moved continuously between the second viewpoint and a third viewpoint which is a viewpoint of a second imaging unit mounted on the second moving body selected by the second operation; and cause the generated second transition video to be displayed in the display area, wherein, in a case where the second moving body selected by the second operation is positioned in a second space, a space moving video is displayed in the display area, the space moving video being based on a continuous movement of the viewpoint position from the second viewpoint to a fourth viewpoint for imaging the second space, and after the space moving video is terminated, the second transition video is displayed in the display area, the second transition video corresponding to the viewpoint position moved continuously between the fourth viewpoint and the third viewpoint.

* * * * *